US011392684B2

(12) United States Patent
Ratnakaram et al.

(10) Patent No.: US 11,392,684 B2
(45) Date of Patent: Jul. 19, 2022

(54) AUTHENTICATION OF USER ACTIVITIES BASED ON ESTABLISHING COMMUNICATION LINKS BETWEEN NETWORK DEVICES

(71) Applicant: BANK OF AMERICA CORPORATION, Charlotte, NC (US)

(72) Inventors: Udaya Kumar Raju Ratnakaram, Telangana (IN); Puneetha Polasa, Telangana (IN)

(73) Assignee: BANK OF AMERICA CORPORATION, Charlotte, NC (US)

( * ) Notice: Subject to any disclaimer, the term of this patent is extended or adjusted under 35 U.S.C. 154(b) by 214 days.

(21) Appl. No.: 16/925,287

(22) Filed: Jul. 9, 2020

(65) Prior Publication Data
US 2022/0012326 A1    Jan. 13, 2022

(51) Int. Cl.
*G06F 21/44*     (2013.01)
*G06F 21/57*     (2013.01)
(Continued)

(52) U.S. Cl.
CPC .............. *G06F 21/44* (2013.01); *G06F 9/542* (2013.01); *G06F 16/90344* (2019.01);
(Continued)

(58) Field of Classification Search
CPC .... G06F 21/44; G06F 16/90344; G06F 9/542; G06F 21/577; H04L 63/105; H04L 63/166
See application file for complete search history.

(56) References Cited

U.S. PATENT DOCUMENTS 6,847,953 B2    1/2005 Kuo
6,853,987 B1    2/2005 Cook
(Continued)

FOREIGN PATENT DOCUMENTS

WO    2020226214 A1    11/2020

OTHER PUBLICATIONS

Brewster, T., "Exclusive: Hack Breaks Your Visa Card's Contactless Limit for Big Frauds," Forbes, Jul. 29, 2019, https://www.forbes.com/sites/thomasbrewster/2019/07/29/exclusive-hackers-can-break-your-credit-cards-30-contactless-limit/#54486b0941e1.
(Continued)

*Primary Examiner* — Catherine Thiaw
(74) *Attorney, Agent, or Firm* — Moore & Van Allen PLLC; Vaidehi Bachoti

(57) ABSTRACT

Embodiments of the invention are directed to systems, methods, and computer program products for authentication of user activities based on establishing communication links between network devices. The invention is structured for dynamically authenticating transmitted activity processing data based on establishing seamless electronic communication handshake between network devices and without requiring user intervention. Specifically, the invention is structured to establish an operative communication link between the second networked device and the user device, wherein establishing the operative communication link comprises establishing a handshake between an entity intelligent platform associated with the second networked device and the multi-channel cognitive resource platform of the user device. Moreover, the invention is structured to authenticate the first activity for based on the identified code match.

20 Claims, 8 Drawing Sheets

(51) Int. Cl.
  *G06F 16/903* (2019.01)
  *G06F 9/54* (2006.01)
  *H04L 9/40* (2022.01)

(52) U.S. Cl.
  CPC .......... *G06F 21/577* (2013.01); *H04L 63/105* (2013.01); *H04L 63/166* (2013.01)

(56) References Cited

U.S. PATENT DOCUMENTS

| | | |
|---|---|---|
| 7,761,381 B1 | 7/2010 | Fitch et al. |
| 8,220,034 B2 | 7/2012 | Hahn et al. |
| 8,494,566 B2 | 7/2013 | Chen et al. |
| 8,612,352 B2 | 12/2013 | Dorsey et al. |
| 8,707,319 B2 | 4/2014 | Nguyen et al. |
| 9,449,345 B2 | 9/2016 | Lundgren et al. |
| 9,842,356 B2 | 12/2017 | McCabe |
| 10,083,467 B2 | 9/2018 | White |
| 10,163,100 B2 | 12/2018 | Hammad et al. |
| 10,395,264 B2 | 8/2019 | Fordyce, III et al. |
| 10,521,610 B1 | 12/2019 | Ledet |
| 10,546,439 B2 | 1/2020 | Williams et al. |
| 10,977,641 B2* | 4/2021 | Faith ............... G06Q 20/223 |
| 11,240,232 B2 | 2/2022 | Meruva et al. |
| 11,244,524 B2 | 2/2022 | Ho et al. |
| 2002/0112155 A1 | 8/2002 | Martherus et al. |
| 2005/0066179 A1 | 3/2005 | Seidlein |
| 2006/0194592 A1 | 8/2006 | Clough |
| 2008/0208762 A1 | 8/2008 | Arthur et al. |
| 2009/0012898 A1 | 1/2009 | Sharma et al. |
| 2010/0024017 A1 | 1/2010 | Ashfield et al. |
| 2010/0049615 A1 | 2/2010 | Rose et al. |
| 2010/0257033 A1 | 10/2010 | Roberts et al. |
| 2012/0209768 A1 | 8/2012 | Nuzzi |
| 2013/0030934 A1 | 1/2013 | Bakshi et al. |
| 2013/0046692 A1 | 2/2013 | Grigg et al. |
| 2013/0046976 A1* | 2/2013 | Rosati ............... H04W 12/03 713/168 |
| 2013/0132568 A1 | 5/2013 | Dankar et al. |
| 2014/0123224 A1 | 5/2014 | Nosrati |
| 2015/0302411 A1 | 10/2015 | Bondesen et al. |
| 2017/0235453 A1 | 8/2017 | Selfridge |
| 2018/0032757 A1* | 2/2018 | Michael ............... G06F 21/31 |
| 2019/0080320 A1 | 3/2019 | Hammad et al. |
| 2020/0201981 A1* | 6/2020 | Wardman ............ H04L 63/102 |
| 2020/0213298 A1* | 7/2020 | Ericson ............... H04W 12/06 |
| 2021/0101563 A1 | 4/2021 | Azarko |
| 2021/0329002 A1 | 10/2021 | Huh et al. |
| 2021/0409405 A1* | 12/2021 | Salajegheh .......... H04L 63/107 |

OTHER PUBLICATIONS

Zhou, Qian, Omkant Pandey, and Fan Ye. "An Approach for Multi-Level Visibility Scoping of IoT Services in Enterprise Environments." IEEE Transactions on Mobile Computing (2020). (Year: 2020).

* cited by examiner

AUTHENTICATION OF USER ACTIVITIES BASED ON ESTABLISHING COMMUNICATION LINKS BETWEEN NETWORK DEVICES

FIELD

The invention is described herein is directed to systems, methods and computer program products for authentication of user activities based on establishing communication links between network devices. In some aspects, the invention is structured for dynamically authenticating transmitted activity processing data based on establishing seamless electronic communication handshake between network devices and without requiring user intervention.

BACKGROUND

Transmissions of activity data associated from networked devices is increasingly widespread. Some conventional systems employ instrument devices with integrated circuit chips (e.g., credit cards with contactless payment chips) that can be read using near field communication or radio frequency communication, for the purposes of easily and quickly transmitting data for initiating activities. Maintaining security of activity data from networked devices and determining authorization of the users and/or the entities involved in the activities is an important concern. However, the instrument devices with integrated circuit chips that can be read using near field communication or radio frequency communication, inherently lack the ability to determine authorization of the user and the entity devices reading the activity data stored therein, and further are not structured for determining validity of activities initiated using the integrated circuit chips. Accordingly, unauthorized individuals may still be able to initiate activities using the integrated circuit chips. Therefore, there is a need for systems, methods and computer program products for maintaining security of and authenticating activity data from networked devices, determining authorization of the users and/or the entities involved in the activities and determining validity of activities.

The previous discussion of the background to the invention is provided for illustrative purposes only and is not an acknowledgement or admission that any of the material referred to is or was part of the common general knowledge as at the priority date of the application.

BRIEF SUMMARY

Some embodiments of the invention are directed to systems, apparatuses, methods and computer program products for authentication of user activities based on establishing communication links between network devices. Specifically, the systems, apparatuses, methods and computer program products of the present invention are structured for dynamically authenticating transmitted activity processing data based on establishing seamless electronic communication handshake between network devices and without requiring user intervention. In some embodiments the apparatuses and systems comprise at least one memory device, at least one communication device connected to a distributed network and at least one processing device operatively coupled to the at least one memory device at least one memory. The apparatuses and systems further comprise a module stored in the at least one memory device comprising executable instructions that when executed by the at least one processing device, cause the at least one processing device to: receive, from a first networked device associated with a first entity, resource activity processing data associated with a first activity initiated at the first networked device by a user, wherein the resource activity processing data comprises a unique identifier associated with the user; transmit a control signal to a second networked device associated with the first entity, wherein the control signal is structured to cause the second networked device to scan a predetermined vicinity radius around the first networked device to identify devices having a multi-channel cognitive resource platform application; in response to identifying the multi-channel cognitive resource platform application on a user device, establish an operative communication link between the second networked device and the user device, wherein establishing the operative communication link comprises establishing a handshake between an entity intelligent platform application associated with the second networked device and the multi-channel cognitive resource platform application of the user device; construct a first device code associated with authenticating the first activity; transmit the constructed first device code to the user device, wherein transmitted first device code is structured to cause the multi-channel cognitive resource platform application of the user device to: (i) transform the first device code into a format compatible with the operative communication link with the second networked device; and (ii) output the transformed first device code to the entity intelligent platform application of the second networked device via the operative communication link; identify a code match, at the entity intelligent platform application of the second networked device, between the transformed first device code output by the user device and the constructed first device code; authenticate the first activity based on the identified code match; in response to determining that the first activity is authenticated, process the resource activity processing data for completing the first activity; and transmit a notification to the first networked device indicating the completion of the first activity.

In some embodiments, or in combination with any of the previous embodiments, establishing the handshake between the entity intelligent platform application associated with the second networked device and the multi-channel cognitive resource platform application of the user device, further comprises: transmitting, from the entity intelligent platform application associated with the second networked device, an entity synchronize message comprising an entity sequence number to the multi-channel cognitive resource platform application of the user device; receiving, at the entity intelligent platform application associated with the second networked device, a user device synchronize acknowledgment message comprising (i) a modified entity sequence number, and (ii) a user device sequence number, from the multi-channel cognitive resource platform application of the user device; and transmitting, from the entity intelligent platform application associated with the second networked device, an entity synchronize acknowledgment message comprising a modified user device sequence number to the multi-channel cognitive resource platform application of the user device.

In some embodiments, or in combination with any of the previous embodiments, establishing the handshake between the entity intelligent platform application associated with the second networked device and the multi-channel cognitive resource platform application of the user device, comprises establishing a mutual communication protocol for upcoming communications between the entity intelligent platform application associated with the second networked device and the multi-channel cognitive resource platform application of the user device via the operative communication link.

In some embodiments, or in combination with any of the previous embodiments, the invention is structured to transmit the constructed first device code associated with authenticating the first activity to the entity intelligent platform application associated with the second networked device, wherein the first device code comprises a string of characters of a predetermined length.

In some embodiments, or in combination with any of the previous embodiments, the second networked device associated with the first entity comprises a beacon transmitter device.

In some embodiments, or in combination with any of the previous embodiments, causing the second networked device to scan a predetermined vicinity radius around the first networked device further comprises: activating a plurality of transmitter devices proximate the first networked device associated with the first entity; causing each of the plurality of transmitter devices to transmit a predetermined signal to scan for devices having the multi-channel cognitive resource platform application, wherein the multi-channel cognitive resource platform application is structured to read the predetermined signal and transmit a response upon receiving the predetermined signal; identifying, via a first transmitter device of the plurality of transmitter devices, the multi-channel cognitive resource platform application on the user device; and disabling the plurality of transmitter devices associated with the first entity.

In some embodiments, or in combination with any of the previous embodiments, authenticating the first activity further comprises authenticating the first activity based on (i) the identified code match and (ii) determining a device match between the user device and the unique identifier associated with the user.

In some embodiments, or in combination with any of the previous embodiments, the resource activity processing data associated with the first activity initiated at the first networked device is associated with a first authentication level. Here, the invention is structured to: analyze, via an authentication analyzer application, prior completed resource activity processing data associated with the user; construct, via an authentication analyzer application, a security exposure value associated with the first activity initiated at the first networked device based on at least (i) spatial congruence of the user device and the second networked device associated with the first authentication level and (ii) the prior completed resource activity processing data associated with the user; and in response to determining, via the authentication analyzer application, that the security exposure value is below a predetermined exposure threshold such that the security exposure value is not associated with a potential security threat, trigger a second authentication level requirement above the first authentication level; wherein triggering the second authentication level requirement comprises transmitting the control signal to the second networked device associated with the first entity to cause the second networked device to scan the predetermined vicinity radius around the first networked device to identify devices having the multi-channel cognitive resource platform application.

In some embodiments, or in combination with any of the previous embodiments, the invention is structured to: escalate the authentication of the first activity to the second authentication level in response to identifying the code match. Here, authenticating the first activity based on the identified code match comprises authenticating the first activity at the second authentication level.

BRIEF DESCRIPTION OF THE DRAWINGS

Figure 1A:
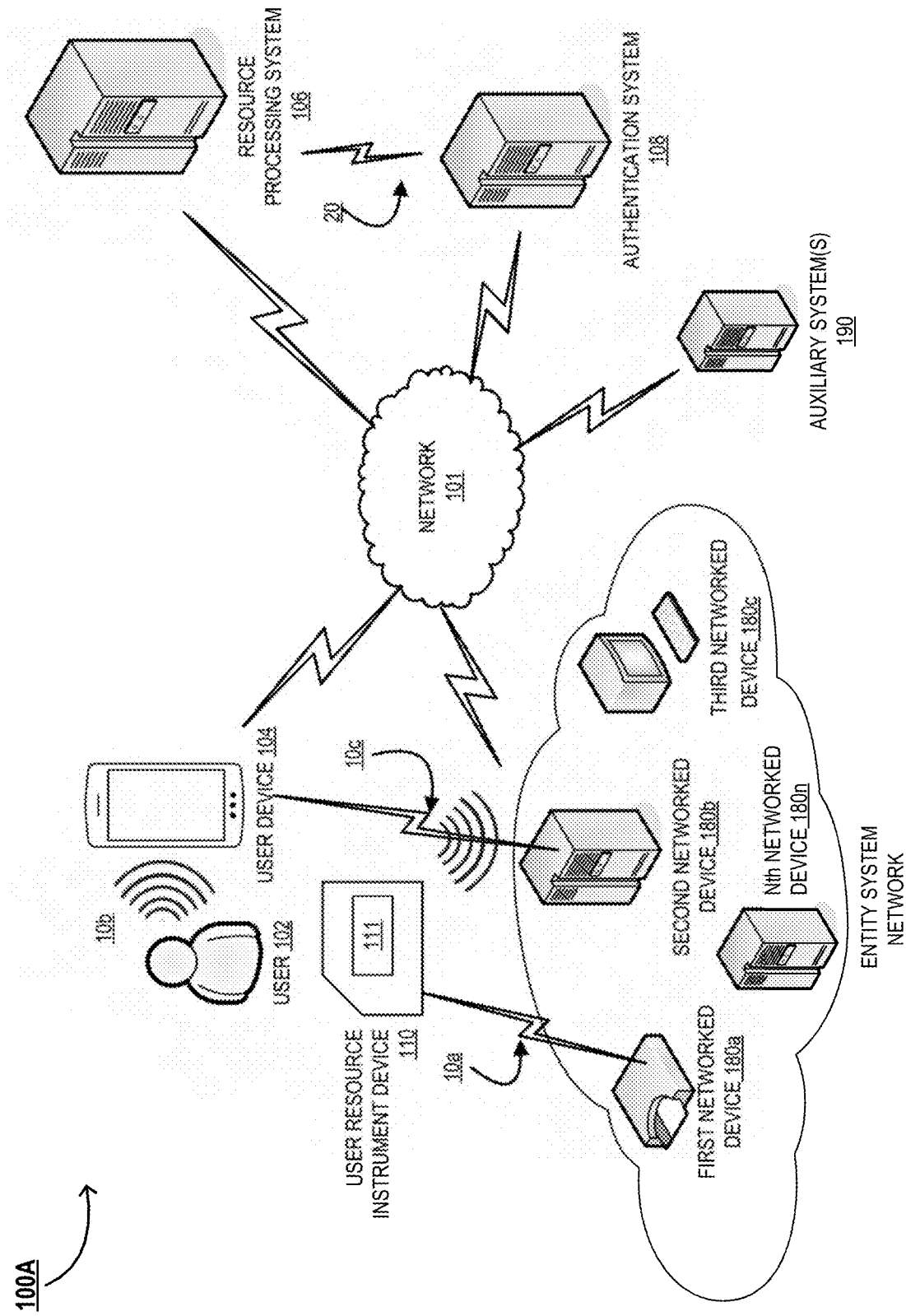
Figure 1B:
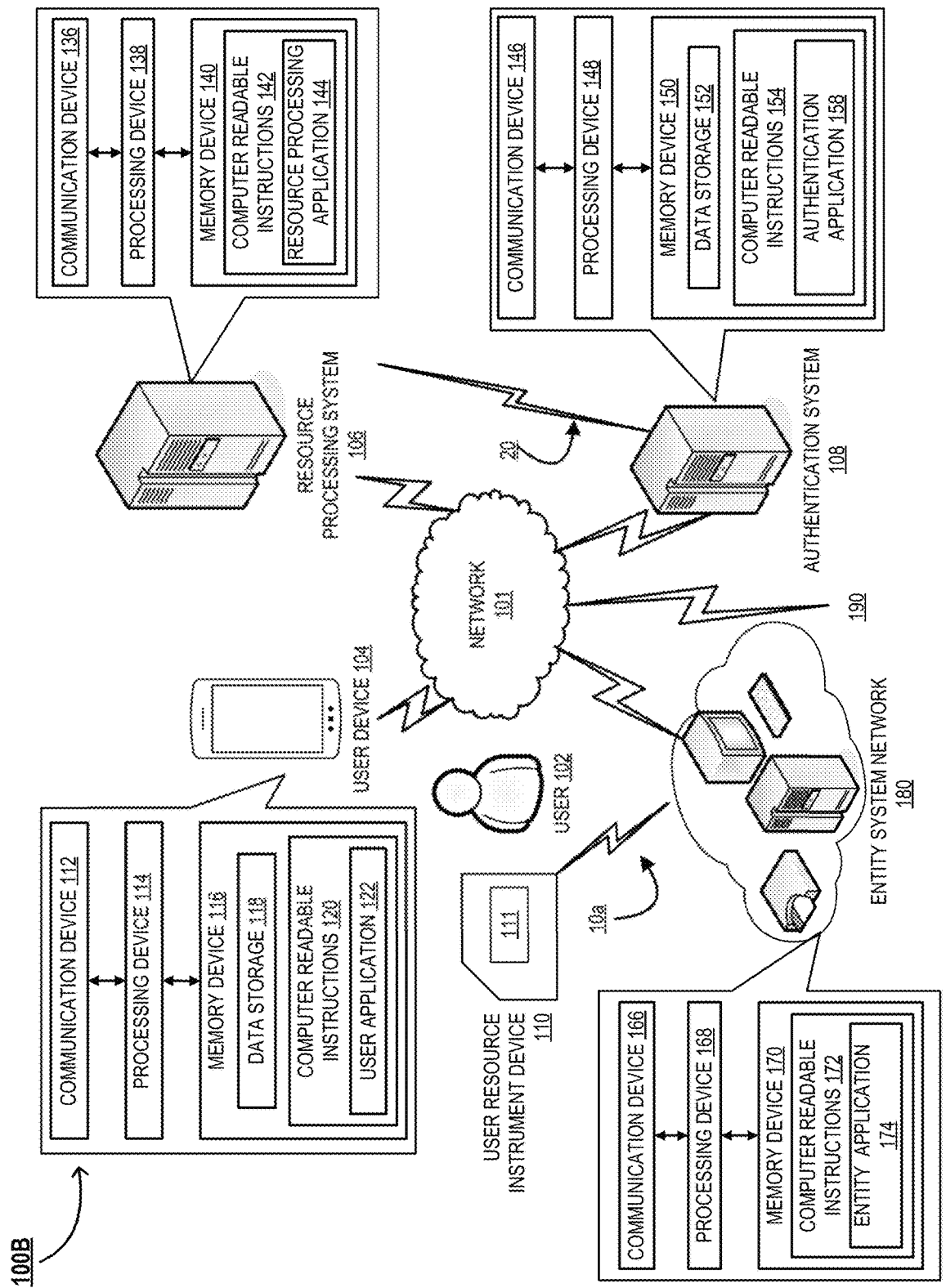
Figure 2:
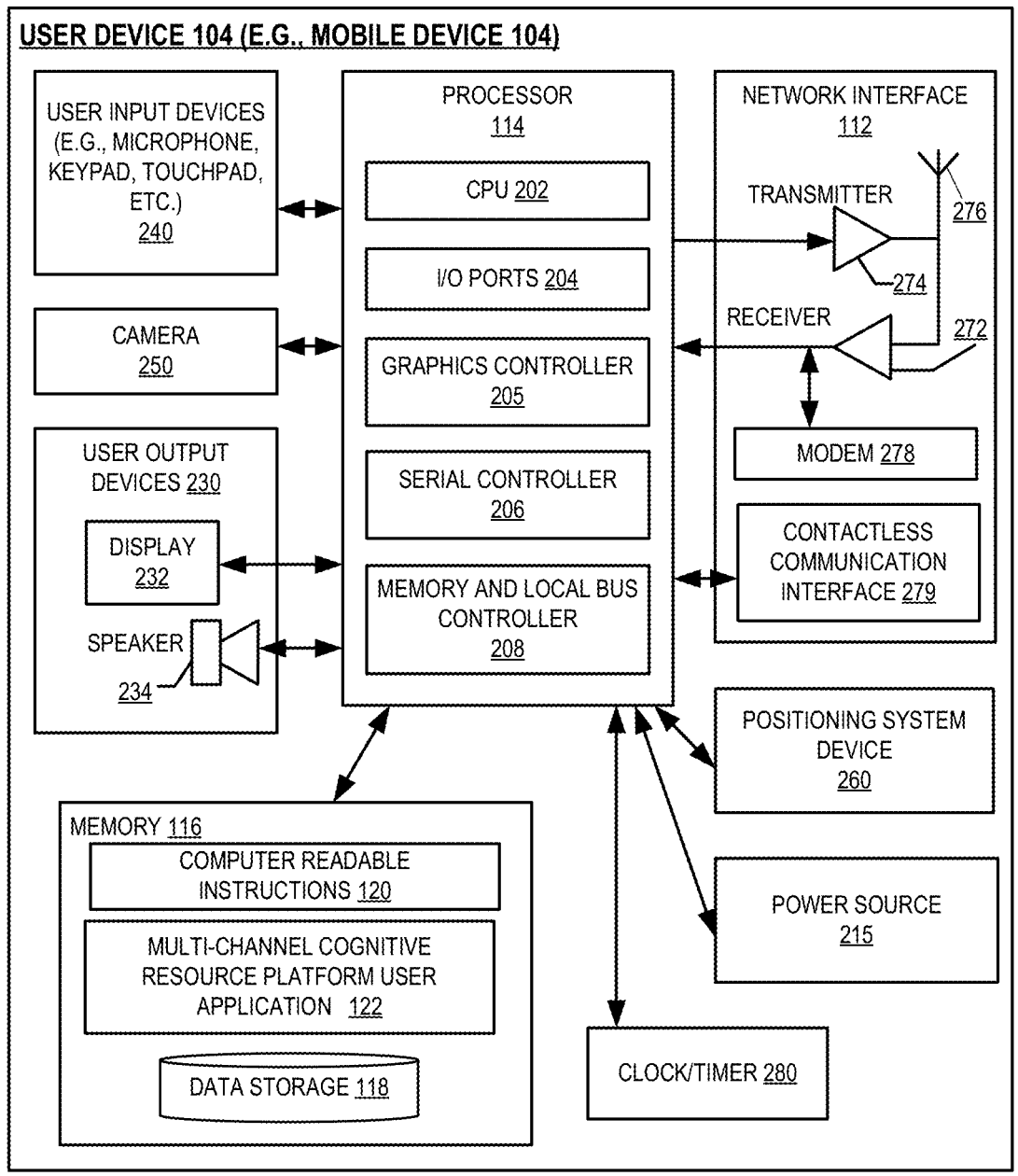
Figure 3:
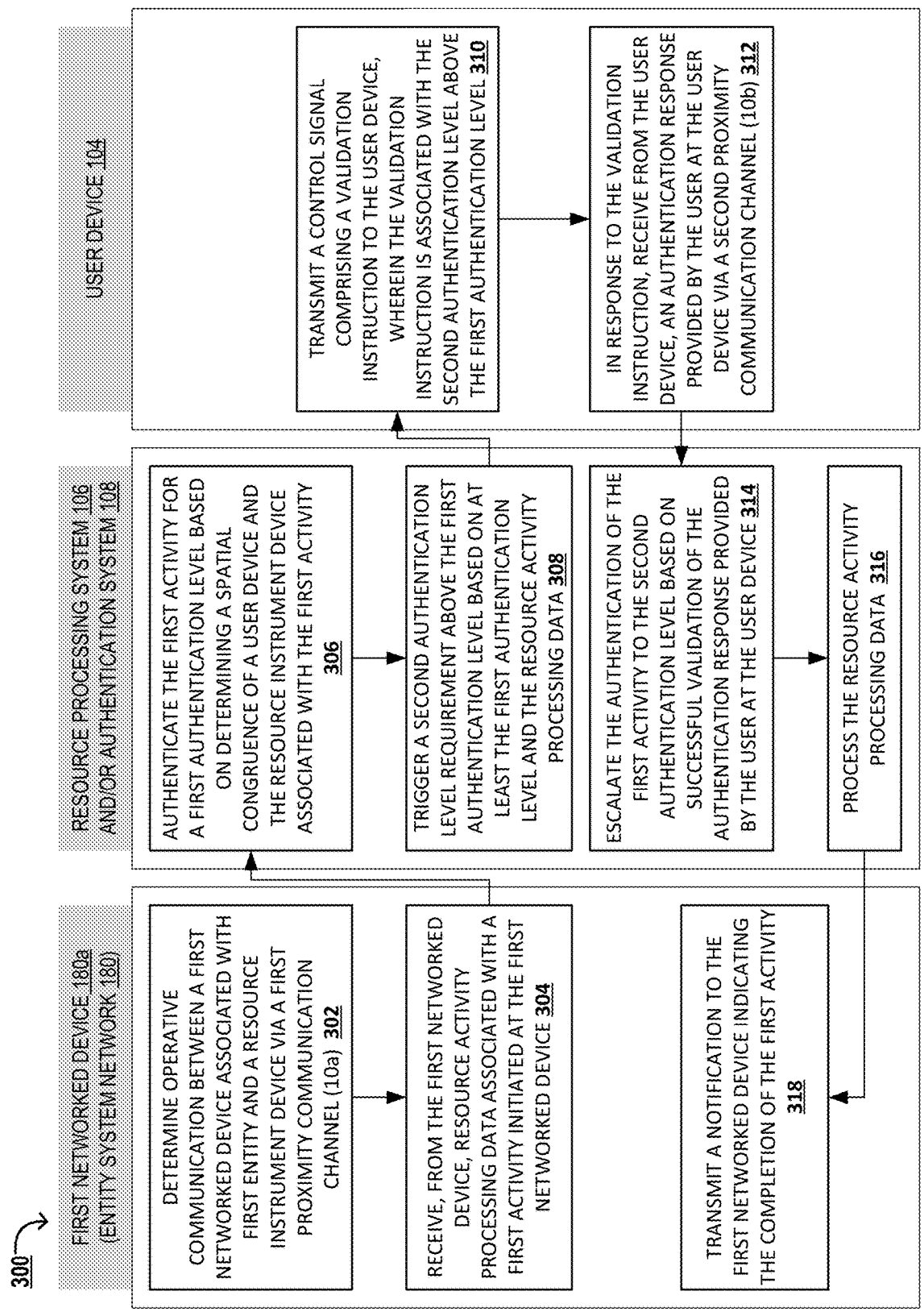
Figure 4A:
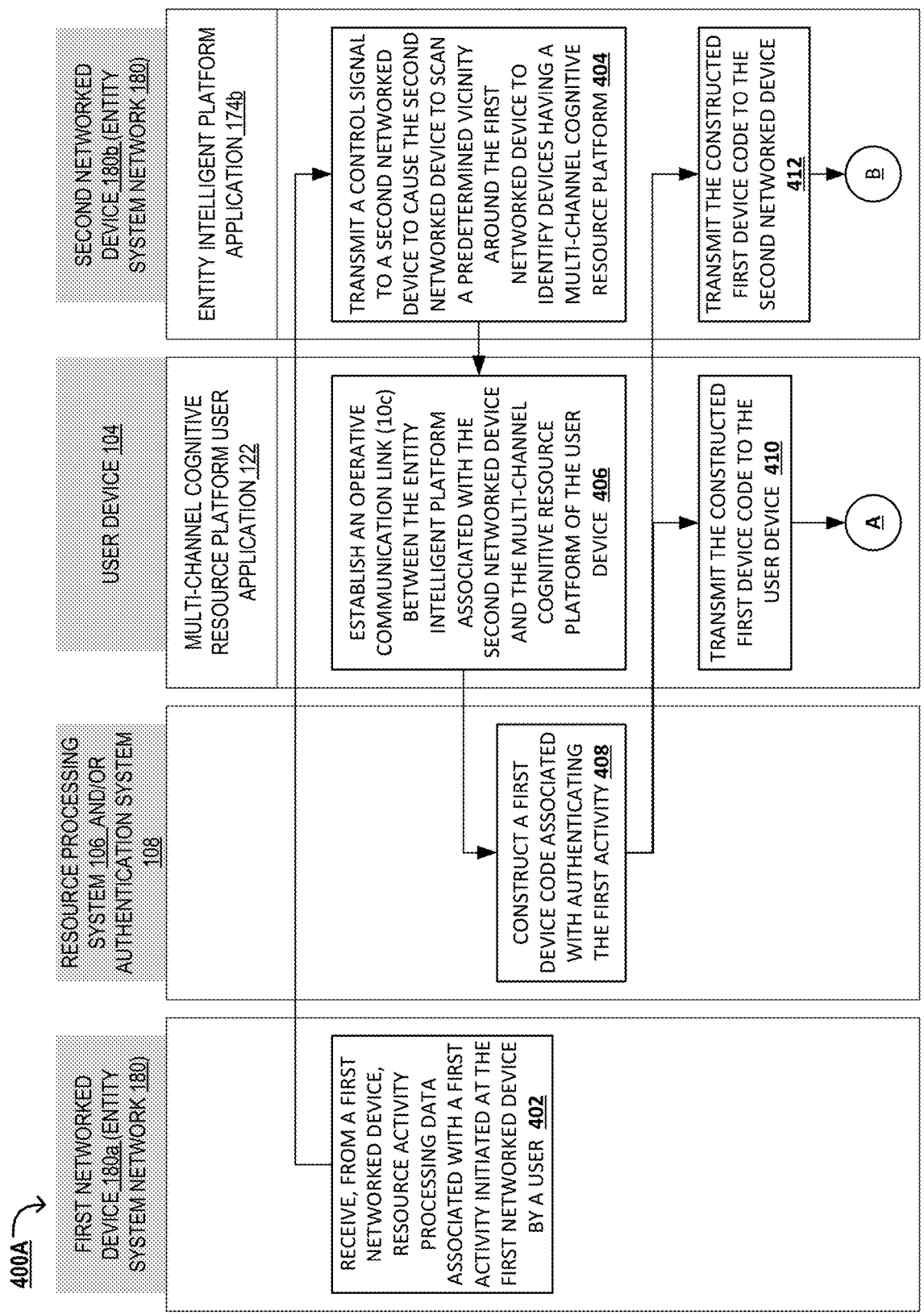
Figure 4B:
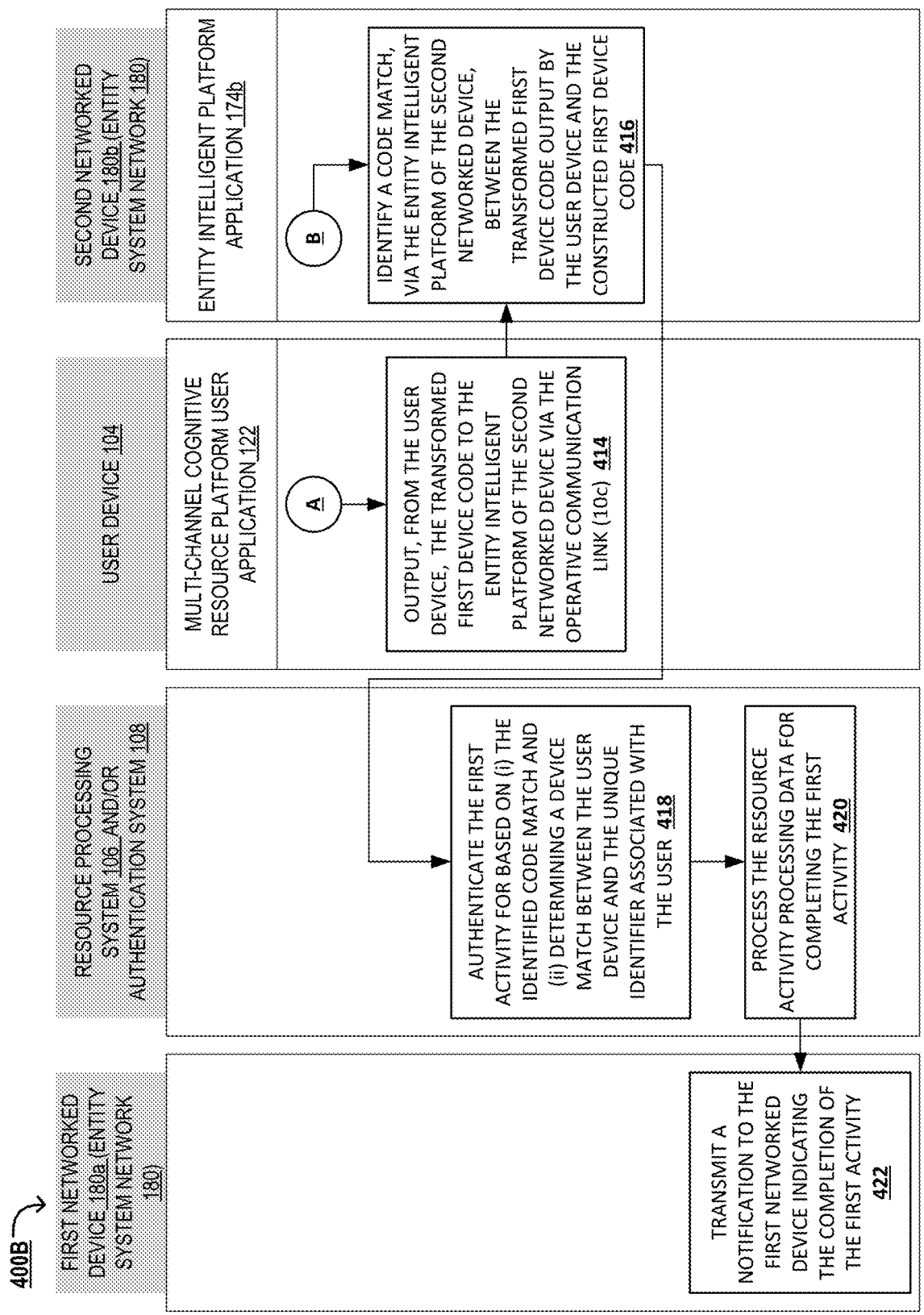
Figure 5A:
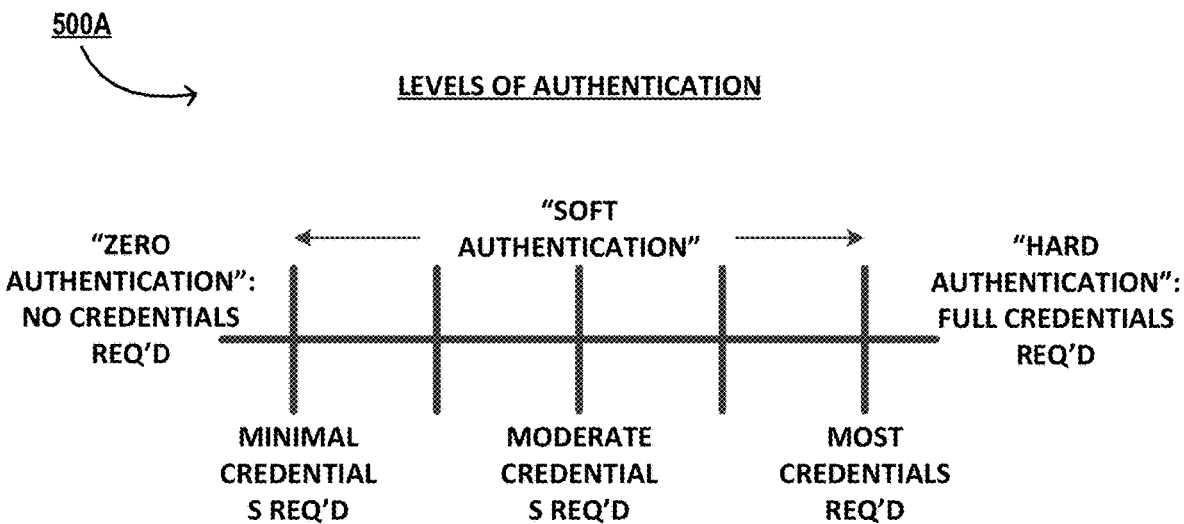
Figure 5B:
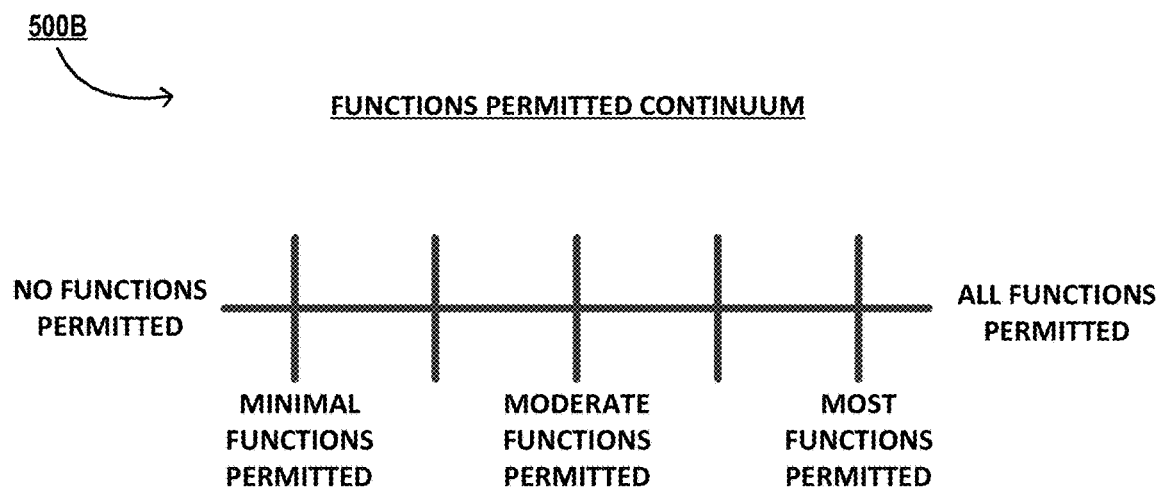
Figure 5C:
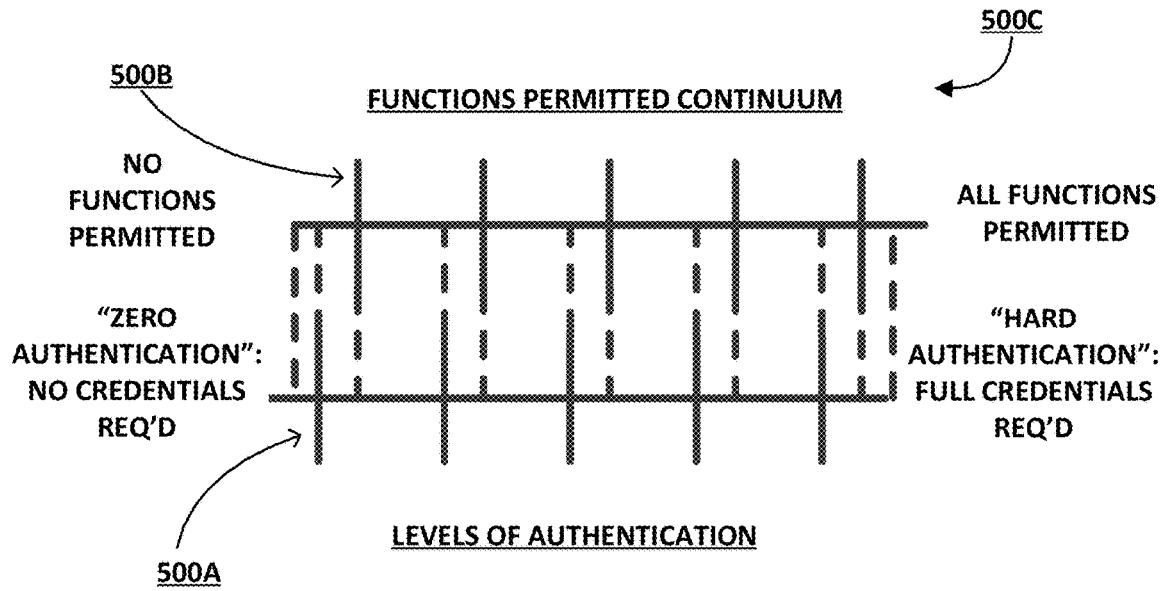
Figure 5D:
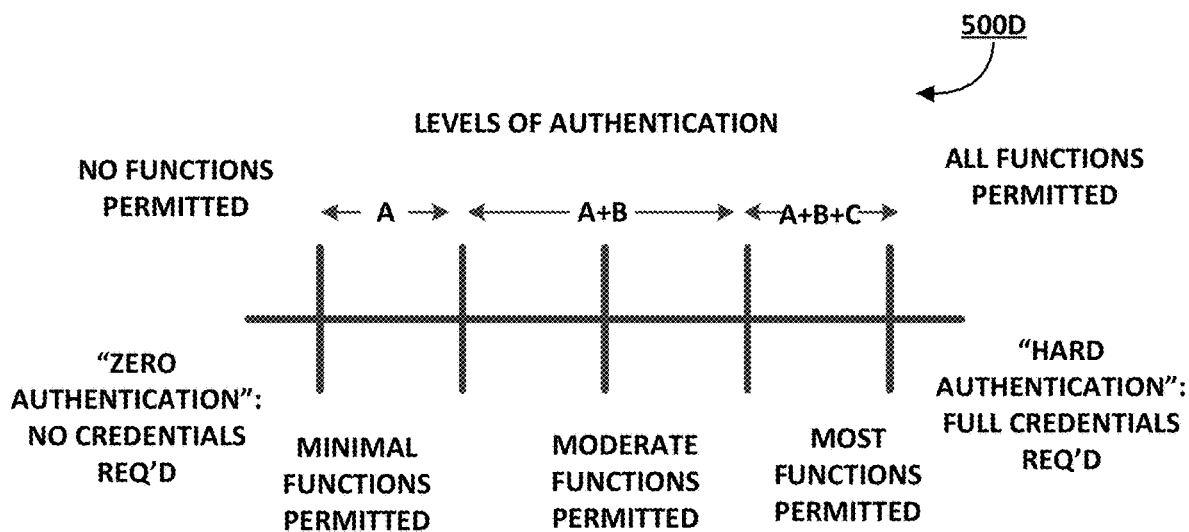

Having thus described embodiments of the invention in general terms, reference will now be made to the accompanying drawings, where:

FIG. 1A illustrates a schematic representation 100A of an authentication system and environment, in accordance with embodiments of the present invention;

FIG. 1B illustrates a schematic representation 100B of the authentication system and environment of FIG. 1A, in accordance with embodiments of the present invention;

FIG. 2 illustrates a schematic representation 200 of a user device, in accordance with embodiments of the present invention;

FIG. 3 illustrates a high-level process flow 300 for dynamic stepped multi-level authentication, in accordance with embodiments of the present invention;

FIG. 4A illustrates a high-level process flow 400A for authentication of user activities based on establishing communication links between network devices, in accordance with embodiments of the present invention;

FIG. 4B illustrates a high-level process flow 400B for authentication of user activities based on establishing communication links between network devices, in continuation with the process flow 400A of FIG. 4A;

FIG. 5A presents an illustration 500A of the authentication continuum in accordance to one embodiment of the invention;

FIG. 5B presents an illustration 500B of the functions permitted continuum in accordance to one embodiment of the invention;

FIG. 5C presents an illustration 500C of the coupling of the functions permitted continuum and the levels of authentication continuum in accordance to one embodiment of the invention; and FIG. 5D presents an illustration 500D of the relationship between the functions permitted and the authentication types in accordance to one embodiment of the invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

In some embodiments, an "entity" as used herein may be a merchant, a seller, a store, a financial institution, and/or the like. In some embodiments, a "merchant" may be defined as any organization, entity, or the like providing product or services for sale to a user. In some embodiments, a "financial institution" may be defined as any organization, entity, or the like in the business of moving, investing, or lending money, dealing in financial instruments, or providing financial services. This may include commercial banks, thrifts, federal and state savings banks, savings and loan associations, credit unions, investment companies, insurance companies and the like. In some embodiments, the entity may allow a user to establish a resource or an account with the entity. A "resource" or "account" may be the relationship that the user has with the entity. Examples of accounts include a deposit account, such as a transactional account (e.g., a banking account), a savings account, an investment account, a money market account, a time deposit, a demand deposit, a pre-paid account, a credit account, user information provided by the user, or the like. The account is associated with and/or maintained by an entity. In other embodiments, an "entity" may not be a financial institution.

Unless specifically limited by the context, a "user activity", "transaction" or "activity" refers to any communication between the user and an entity (e.g., a merchant, a financial institution, and/or another entity). In some embodiments, for example, a user activity may refer to a purchase of goods or services, a return of goods or services, a payment transaction, a credit transaction, or other interaction involving a user's resource, e.g., bank account. As another example, in some embodiments, a user activity may refer to viewing account balances, modifying user information and contact information associated with an account, modifying alert/notification preferences, viewing transaction/activity history, transferring/redeeming loyalty points and the like. In some embodiments, the user activity is associated with an entity application stored on a user device, for example, a digital wallet application, a mobile/online banking application, a merchant application, a browser application, a social media application and the like. Typically, a user activity is an electronic transaction or electronic activity in which the user is employing a mobile device, computing device, or other electronic device to initiate, execute and/or complete the activity.

As used herein, a "resource" may refer to a bank account, a credit account, a debit/deposit account, or the like. Although the phrase "bank account" includes the term "bank," the account need not be maintained by a bank and may, instead, be maintained by other financial institutions. For example, in the context of a financial institution, a user activity or transaction may refer to one or more of a sale of goods and/or services, an account balance inquiry, a rewards transfer, an account money transfer, opening a bank application on a user's computer or mobile device, a user accessing their e-wallet (e.g., mobile wallet) or online banking account or any other interaction involving the user and/or the user's device that is detectable by the financial institution. As further examples, a user activity may occur when an entity associated with the user is alerted via the transaction of the user's location. A user activity may occur when a user accesses a building or a dwelling, uses a rewards card, and/or performs an account balance query. A user activity may occur as a user's device establishes a wireless connection, such as a Wi-Fi connection, with a point-of-sale terminal. In some embodiments, a user activity may include one or more of the following: purchasing, renting, selling, and/or leasing goods and/or services (e.g., groceries, stamps, tickets, DVDs, vending machine items, and the like); withdrawing cash; making payments (e.g., paying monthly bills; paying federal, state, and/or local taxes; and the like); sending remittances; transferring balances from one account to another account; loading money onto stored value cards (SVCs) and/or prepaid cards; donating to charities; and/or the like.

In some embodiments, a "resource" may refer to an online banking account, such as an account that is associated with one or more user accounts at a financial institution. For example, the user may have an online banking account that is associated with the user's checking account, savings account, investment account, and/or credit account at a particular financial institution. Authentication credentials comprising a username and password are typically associated with the online banking account and can be used by the user to gain access to the online banking account. The online banking account may be accessed by the user over a network (e.g., the Internet) via a computer device, such as a personal computer, laptop, or mobile device (e.g., a smartphone or tablet). The online banking account may be accessed by the user via a mobile or online banking website or via a mobile or online banking application. A customer may access an online banking account to view account balances, view transaction history, view statements, transfer funds, and pay bills. More than one user may have access to the same online banking account. In this regard, each user may have a different username and password. Accordingly, one or more users may have a sub-account associated with the online banking account.

In some embodiments, a "user" may be an individual or group of individuals associated with user activities such as purchases from an entity such as a merchant. In some embodiments, a "user" may be an individual or group of individuals associated with resources (e.g., accounts, credit cards, etc.) at an entity such as a financial institution. A "user" may be an individual or group of individuals associated with an entity that provides the system for assessing authentication requirements based on situational instance. In some embodiments, the "user" may be a financial institution user (e.g., an account holder or a person who has an account (e.g., banking account, credit account, or the like)). In one aspect, a user may be any financial institution user seeking to perform user activities associated with the financial institution or any other affiliate entities associated with the financial institution. In some embodiments, the user may be an individual who may be interested in opening an account with the financial institution. In some other embodiments, a user may be any individual who may be interested in the authentication features offered by the financial institution/entity. In some embodiments, a "user" may be a financial institution employee (e.g., an underwriter, a project manager, an IT specialist, a manager, an administrator, an internal operations analyst, bank teller or the like) capable of operating the system described herein. For purposes of this invention, the term "user" and "customer" may be used interchangeably.

Transmissions of activity data associated from networked devices is increasingly widespread. Some conventional systems employ instrument devices with integrated circuit chips (e.g., credit cards with contactless payment chips) that can be read using near field communication or radio frequency communication, for the purposes of easily and quickly transmitting data for initiating activities. Maintaining security of activity data from networked devices and determining authorization of the users and/or the entities involved in the activities is an important concern. However, the instrument devices with integrated circuit chips that can be read using near field communication or radio frequency communication, inherently lack the ability to determine authorization of the user and the entity devices reading the activity data stored therein, and further are not structured for determining validity of activities initiated using the integrated circuit chips. Conventional systems employ mere GPS data to authenticate user activities, for both activities that involve instrument devices and for those that involve unique identifiers of the users. For instance, when the user misplaces the instrument devices with the integrated circuit chips, the user may also misplace the user device. Merely determining the geolocation of the misplaced user device would result in a false authorization of the user activity. Accordingly, unauthorized individuals may still be able to initiate activities using the integrated circuit chips. Therefore, there is a need for systems, methods and computer program products for maintaining security of and authenticating activity data from networked devices, determining authorization of the users and/or the entities involved in the activities and determining validity of activities.

Embodiments of the present invention address the above needs and/or achieve other advantages by providing apparatuses (e.g., a system, computer program product and/or other devices) and methods for dynamic stepped multi-level authentication, and authentication of user activities based on establishing communication links between network devices, as will be described in detail elsewhere in the specification.

FIGS. 1A-1B illustrate schematic representations 100A and 100B of an authentication system and environment 100, in accordance with embodiments of the present invention. FIGS. 1A-1B provide a unique system that includes specialized servers and systems, communicably linked across a distributive network of nodes required to perform the functions of providing dynamic authentication paradigms, such as (i) dynamic stepped multi-level authentication, and (ii) authentication of user activities based on establishing communication links between network devices. The authentication system provides a dynamic platform for progressively authenticating transmitted activity processing data over escalating authentication levels using electronic communications between network devices over separate communication channels. The authentication system further provides a platform for dynamically authenticating transmitted activity processing data based on establishing seamless electronic communication handshake between network devices and without requiring user intervention. As illustrated in FIGS. 1A-1B, the authentication system 108 or application server is operatively coupled, via a network 101 to the user device 104, to the resource processing system 106, and one or more devices of an entity system network 180 (e.g., first networked device 180a, second networked device 180b, third networked device 180c, . . . , N$^{th}$ networked device 180n, and/or the like) and to one or more auxiliary systems 190. In this way, the authentication system 108 can send information to and receive information from the user device 104, the resource processing system 106 or financial institution server, the auxiliary systems 190, etc. FIGS. 1A-1B illustrates only one example of an embodiment of the system environment 100, and it will be appreciated that in other embodiments one or more of the systems, devices, or servers may be combined into a single system, device, or server, or be made up of multiple systems, devices, or servers.

The network 101 may be a system specific distributive network receiving and distributing specific network signals and identifying specific network associated triggers. The network 101 may also be a global area network (GAN), such as the Internet, a wide area network (WAN), a local area network (LAN), or any other type of network or combination of networks. The network 101 may provide for wireline, wireless, or a combination wireline and wireless communication between devices on the network 101. In some embodiments, the network 101 may enable communication between devices thorough near-field communication, transmission of electromagnetic waves, sound waves or any other suitable means. In some embodiments, the network 101 includes the internet. In some embodiments, the network 101 may include a wireless telephone network. Furthermore, the network 101 may comprise wireless communication networks to establish wireless communication channels such as a contactless communication channel and a near field communication (NFC) channel (for example, in the instances where communication channels are established between the user mobile device 104 and the second networked device 180b). In this regard, the wireless communication channel may further comprise near field communication (NFC), communication via radio waves, communication through the internet, communication via electromagnetic waves and the like.

In some embodiments, the user 102 is an individual that has a user device 104, such as a mobile phone, tablet, or the like. The user device 104 may be, for example, a desktop personal computer, a mobile system, such as a cellular phone, smart phone, personal data assistant (PDA), laptop, or the like. The user device 104 generally comprises a communication device 112, a processing device 114, and a memory device 116. The user device 104 may comprise other devices that are not illustrated, configured for location determination/navigation (GPS devices, accelerometers and the like), for authentication (fingerprint scanners, microphones, iris scanners and the like), for image capture (cameras, AR devices and the like), for display (screens, hologram projectors and the like), and other purposes, as will be described with respect to FIG. 2 later on. The user device 104 is a computing system that enables the user to perform one or more authentication functions for one or more user activities. The processing device 114 is operatively coupled to the communication device 112 and the memory device 116. The processing device 114 uses the communication device 112 to communicate with the network 101 and other devices on the network 101, such as, but not limited to the resource processing system 106, the compatible devices (180a-180n) of the entity system network 180 and the authentication system 108. As such, the communication device 112 generally comprises a modem, server, or other device for communicating with other devices on the network 101. In some embodiments, the user device 104 may comprise one or more user devices comprising mobile phones, tablets, smartphones, computers and wearable devices like smart watches, glasses, jewelry, fitness and activity monitors and the like.

The user device 104 comprises computer-readable instructions 120 and data storage 118 stored in the memory device 116, which in one embodiment includes the computer-readable instructions 120 of a user application 122. The user application 122 is also referred to as a "multi-channel cognitive resource platform user application 122" or a "multi-channel cognitive resource platform application 122," as will be described with respect to FIG. 2 later on. In some embodiments user device 104 may refer to multiple user devices that may be configured to communicate with the authentication system and/or the resource processing system 106 via the network 101. The user application 122 or the multi-channel cognitive resource platform user application 122 may be a standalone application configured for dynamic authentication assessment or the user application 122 may refer to one or more existing applications on the user device. In some embodiments the authentication system 108 and/or the resource processing system 106 may transmit control signals to the user device, configured to cause the user application 122 to perform one or more functions or steps associated with dynamic stepped multi-level authentication, and authentication of user activities based on establishing communication links between network devices. The user 102 may communicate with the user device 104 via a proximity communication channel 10b involving, audio communication, gesture-based communication, video communication, textual communication, biometric based communication, and/or the like.

The user 102 may further be associated with a resource instrument device 110. Typically, the resource instrument device 110 comprises an integrated circuit chip 111 and an antenna (not illustrated). The resource instrument device 110 is structured for contactless communication with the first networked device 180a (e.g., a chip-card reader 180a at a point of sale terminal, a point of sale terminal, an ATM, etc.) of the entity system network 180 via a first proximity channel 10a. Communication via the first proximity channel 10a comprises communications using near field communication and/or radio frequency communication (RFID). In some embodiments, the resource instrument device 110 comprises credit or debit cards structured for contactless payment. The embedded integrated circuit chip 111 and antenna allow for the user 102 to wave their resource instrument device 110 proximate a reader at the first networked device 180a (e.g., a chip-card reader 180a at a point of sale terminal, a point of sale terminal, an ATM, etc.) of the entity system network 180, e.g., for performing resource transfers (e.g., payments) for a user activity (e.g., purchase).

As further illustrated in FIGS. 1A-1B, the authentication system 108 generally comprises a communication device 146, a processing device 148, and a memory device 150. As used herein, the term "processing device" generally includes circuitry used for implementing the communication and/or logic functions of the particular system. For example, a processing device may include a digital signal processor device, a microprocessor device, and various analog-to-digital converters, digital-to-analog converters, and other support circuits and/or combinations of the foregoing. Control and signal processing functions of the system are allocated between these processing devices according to their respective capabilities. The processing device may include functionality to operate one or more software programs based on computer-readable instructions thereof, which may be stored in a memory device.

The processing device 148 is operatively coupled to the communication device 146 and the memory device 150. The processing device 148 uses the communication device 146 to communicate with the network 101 and other devices on the network 101, such as, but not limited to the resource processing system 106, the user device 104 and the auxiliary systems 190. As such, the communication device 146 generally comprises a modem, server, or other device for communicating with other devices on the network 101.

As further illustrated in FIGS. 1A-1B, the authentication system 108 comprises computer-readable instructions 154 stored in the memory device 150, which in one embodiment includes the computer-readable instructions 154 of an authentication application 158. In some embodiments, the memory device 150 includes data storage 152 for storing data related to the system environment, but not limited to data created and/or used by the authentication application 158. In some embodiments, the authentication application 158 provides assessment of network authentication requirements based on situational instance. The authentication application 158 may comprise a proximity analyzer application 158a, an authentication analyzer application 158b, and/or the like.

In the embodiment illustrated in FIGS. 1A-1B and described throughout much of this specification, the authentication application 158 is structured for dynamic stepped multi-level authentication, and authentication of user activities based on establishing communication links between network devices. In some embodiments, the authentication system 108 may retrieve user authentication information, financial information, and the like from the resource processing system 106. In some embodiments, the authentication application 158 may receive activity data associated with prior completed resource activity processing data associated with the user from the resource processing system 106. In this way, the authentication application 158 may communicate with the resource processing system 106, the user device 104, auxiliary system(s) 190, merchant systems and other third-party systems to determine authentication requirements for a particular activity.

In some embodiments, the authentication application 158 may control the functioning of the user device 104. In some embodiments, the authentication application 158 computer readable instructions 154 or computer-readable program code, the when executed by the processing device 148, causes the processing device to perform one or more steps involved in (i) dynamic stepped multi-level authentication, and (ii) authentication of user activities based on establishing communication links between network devices, and/or transmit control instructions to other systems and devices to cause the systems and devices to perform specific tasks, as described with respect to process flows 300-400B of FIG. 3-FIG. 4B.

As illustrated in FIGS. 1A-1B, the resource processing system 106 is connected to the authentication system 108 and is associated with a financial institution network. In this way, while only one resource processing system 106 is illustrated in FIGS. 1A-1B, it is understood that multiple network systems may make up the system environment 100. The resource processing system 106 generally comprises a communication device 136, a processing device 138, and a memory device 140. The resource processing system 106 comprises computer-readable instructions 142 stored in the memory device 140, which in one embodiment includes the computer-readable instructions 142 of a resource processing application 144. The resource processing system 106 may communicate with the authentication system 108 to provide authentication credentials for user activities. The authentication system 108 may communicate with the resource processing system 106 via a secure connection 20 generated for secure encrypted communications between the two systems for ascertaining authentication requirements. In some embodiments, the secure connection 20 may be an operative communication link/channel established via the network 101.

As illustrated in FIGS. 1A-1B, the authentication system and environment comprises an entity system network 180 having one or more devices, such as, a first networked device 180a, a second networked device 180b, a third networked device 180c, . . . , an $N^{th}$ networked device 180n, and/or the like. In some embodiments, the first networked device 180a is a chip-card reader at a point of sale terminal, a point of sale terminal, an ATM, and/or the like, structured for contactless communication with the resource instrument device 110 via the first proximity channel 10a. Communication via the first proximity channel 10a comprises communications using near field communication and/or radio frequency communication (RFID). This allows for the user 102 to wave their resource instrument device 110 proximate a reader at the first networked device 180*a* (e.g., a chip-card reader 180*a* at a point of sale terminal, a point of sale terminal, an ATM, etc.) of the entity system network 180, e.g., for performing resource transfers (e.g., payments) for a user activity (e.g., purchase). The second networked device 180*b* may refer to an entity device or group of devices (e.g., a beacon, a transmitter device, a beacon transmitter, a sensor device, a processing device, and/or the like, and/or a combination of the foregoing) having an entity intelligent platform application stored thereon. The entity intelligent platform application may be similar to the multi-channel cognitive resource platform application associated with the user device 104. The second networked device 180*b* is structured to scan a predetermined vicinity around the first networked device to identify devices having a multi-channel cognitive resource platform. The second networked device 180*b* is structured to establish an operative communication link 10*c* with the user device 104. Here, establishing the operative communication link comprises establishing a handshake between an entity intelligent platform associated with the second networked device and the multi-channel cognitive resource platform of the user device. Moreover, the second networked device 180*b* is structured to identify a code match between the transformed first device code output by the user device and the constructed first device code, via the entity intelligent platform of the second networked device, as will be described with respect to FIGS. 4A and 4B.

In some embodiments, each of the one or more devices of the entity system network 180 (e.g., first networked device 180*a*, second networked device 180*b*, third networked device 180*c*, . . . , N$^{th}$ networked device 180*n*, and/or the like) may comprise a communication device 166, a processing device 168, and a memory device 170. The memory device 170 may further comprise computer readable instructions 172, and an entity application 174. For the second networked device 180*b*, the entity application 174 may refer to the entity intelligent platform application 174. In some embodiments, the entity intelligent platform application 174 is substantially similar to the multi-channel cognitive resource platform application 122, except that it is structured for performing back-end resource processing activities of the entity (while the multi-channel cognitive resource platform application 122 is user-facing and is structured for user interaction based activities).

The auxiliary system(s) 190 may be similar to the user device 104 and/or the resource processing system 106. The auxiliary system(s) 190 may comprise a communication device, a processing device, and a memory device having one or more applications.

It is understood that the servers, systems, and devices described herein illustrate one embodiment of the invention. It is further understood that one or more of the servers, systems, and devices can be combined in other embodiments and still function in the same or similar way as the embodiments described herein.

FIG. 2 illustrates a schematic representation 200 of a user device 104, in accordance with embodiments of the present invention. The user device 104 may also be referred to as a "user mobile device" 104 may be any mobile communication device, such as a cellular telecommunications device (i.e., a cell phone or mobile phone), personal digital assistant (PDA), a mobile Internet accessing device, or another user mobile device including, but not limited to portable digital assistants (PDAs), pagers, mobile televisions, entertainment devices, laptop computers, cameras, video recorders, audio/video player, radio, GPS devices, any combination of the aforementioned devices.

The user mobile device 104 may generally include a processing device or processor 114 communicably coupled to devices such as, a memory device 116, user output devices 230 (for example, a user display device 232, or a speaker 234), user input devices 240 (such as a microphone, keypad, touchpad, touch screen, and the like), a communication device or network interface device 112, a power source 215, a clock or other timer 280, a visual capture device such as a camera 250, a positioning system device 260, such as a geo-positioning system device like a GPS device, an accelerometer, and the like, one or more chips, and the like. The processor 114 may further include a central processing unit 202, input/output (I/O) port controllers 204, a graphics controller 205, a serial bus controller 206 and a memory and local bus controller 208.

The processor 114 may include functionality to operate one or more software programs or applications, which may be stored in the memory device 116. For example, the processor 114 may be capable of operating applications such as the multi-channel cognitive resource platform application 122. The multi-channel cognitive resource platform application 122 may then allow the user mobile device 104 to transmit and receive data and instructions from second networked device 180*b* (e.g., via the channel 10*c*), the authentication system 108 and/or the resource processing system 106, web content, such as, for example, location-based content and/or other web page content, according to a Wireless Application Protocol (WAP), Hypertext Transfer Protocol (HTTP), and/or the like.

The multi-channel cognitive resource platform user application 122 may include the necessary circuitry to provide token storage and transmission functionality, transmitter device signal encoding and decoding functionality to the user mobile device 104, for secure transmission of financial and authentication credential tokens via the contactless communication interface 279 to the second networked device 180*b*. That said, in some embodiments the multi-channel cognitive resource platform user application 122 is pre-installed on the user mobile device 104, while in other embodiments, the authentication system 108 and/or the resource processing system 106 may transmit and cause installation of the application 122 based on determining that the user mobile device 104 does not comprise the application 122.

The processor 114 may be configured to use the network interface device 112 to communicate with one or more other devices on a network 101 such as, but not limited to the second networked device 180*b*, the authentication system 108 and/or the resource processing system 106. In this regard, the network interface device 112 may include an antenna 276 operatively coupled to a transmitter 274 and a receiver 272 (together a "transceiver"), modem 278 and a contactless communication interface 279. The processor 114 may be configured to provide signals to and receive signals from the transmitter 274 and receiver 272, respectively. The signals may include signaling information in accordance with the air interface standard of the applicable BLE standard, cellular system of the wireless telephone network and the like, that may be part of the network 101. In this regard, the user mobile device 104 may be configured to operate with one or more air interface standards, communication protocols, modulation types, and access types. By way of illustration, the user mobile device 104 may be configured to operate in accordance with any of a number of first, second, third, and/or fourth-generation communication protocols and/or the like. For example, the user mobile device 104 may be configured to operate in accordance with second-generation (2G) wireless communication protocols IS-136 (time division multiple access (TDMA)), GSM (global system for mobile communication), and/or IS-95 (code division multiple access (CDMA)), or with third-generation (3G) wireless communication protocols, such as Universal Mobile Telecommunications System (UMTS), CDMA2000, wideband CDMA (WCDMA) and/or time division-synchronous CDMA (TD-SCDMA), with fourth-generation (4G) wireless communication protocols, and/or the like. The user mobile device 104 may also be configured to operate in accordance with non-cellular communication mechanisms, such as via a wireless local area network (WLAN) or other communication/data networks. The user mobile device 104 may also be configured to operate in accordance Bluetooth® low energy, audio frequency, ultrasound frequency, or other communication/data networks.

The network interface device 112 or communication device 112 may also include a user activity interface presented in user output devices 230 in order to allow a user 102 to execute some or all of processes described herein. The application interface may have access to the hardware, for example, the transceiver, and software previously described with respect to the network interface device 112. Furthermore, the application interface may have the ability to connect to and communicate with an external data storage on a separate system within the network 101. As described above, the user mobile device 104 includes a display device 232 having a user interface that includes user output devices 230 and/or user input devices 240. The user output devices 230 may include a display 232 (e.g., a liquid crystal display (LCD) or the like) and a speaker 234 or other audio device, which are operatively coupled to the processor 114. The user input devices 240, which may allow the user mobile device 104 to receive data from the user 102, may include any of a number of devices allowing the user mobile device 104 to receive data from a user 102, such as a keypad, keyboard, touch-screen, touchpad, microphone, mouse, joystick, other pointer device, button, soft key, and/or other input device(s).

The user mobile device 104 may further include a power source 215 (e.g., a rechargeable DC power source). Generally, the power source 215 is a device that supplies electrical energy to an electrical load. In some embodiment, power source 215 may convert a form of energy such as solar energy, chemical energy, mechanical energy, and the like, to electrical energy. Generally, the power source 215 in a user mobile device 104 may be a battery, such as a lithium battery, a nickel-metal hydride battery, or the like, that is used for powering various circuits, for example, the transceiver circuit, and other devices that are used to operate the user mobile device 104. Alternatively, the power source 215 may be a power adapter that can connect a power supply from a power outlet to the user mobile device 104. In such embodiments, a power adapter may be classified as a power source "in" the user mobile device 104.

As discussed previously, the user device 104 comprises computer-readable instructions 120 and data storage 118 stored in the memory device 116, which in one embodiment includes the computer-readable instructions 120 of a user application 122 (a multi-channel cognitive resource platform application 122). The user mobile device 104 may also include a memory buffer, cache memory or temporary memory device operatively coupled to the processor 114. Typically, one or more applications such as the multi-channel cognitive resource platform user application 122, are loaded into the temporarily memory during use. As used herein, memory may include any computer readable medium configured to store data, code, or other information. The memory device 116 may include volatile memory, such as volatile Random-Access Memory (RAM) including a cache area for the temporary storage of data. The memory device 116 may also include non-volatile memory, which can be embedded and/or may be removable. The non-volatile memory may additionally or alternatively include an electrically erasable programmable read-only memory (EEPROM), flash memory or the like.

In some instances, the user mobile device 104 comprises sensor devices 240 comprising biometric sensors for capturing parameters associated with the user, such as fingerprint scanners, voice recognition sensors, facial recognition sensors, cardiac sensors, user stress level sensors and the like. These biometric sensors 240 are configured to retrieve, receive, analyze and or validate biometric credentials associated with the user. In this regard, the biometric sensors 240 may comprise optical sensors, ultrasonic sensors, and/or capacitance sensors. The biometric sensors may further comprise radio frequency, thermal, pressure, piezo-resistive/piezoelectric, microelectromechanical sensors, and the like.

The functions, and features of the multi-channel cognitive resource platform user application 122 will now be described in detail. Typically, the multi-channel cognitive resource platform application 122 is structured for providing an intelligent, proactive and responsive application or system, at a user device 104, which facilitates execution of electronic activities in an integrated manner, and which is capable of adapting to the user's natural communication and its various modes by allowing seamless switching between communication channels/mediums in real time or near real time. As such, the multi-channel cognitive resource platform, and the multi-channel cognitive resource user application 122 in particular, is configured to function as an intelligent personal assistant and resource navigator and is configured to perform one or more electronic user activities by harnessing the functionality of multiple applications resident on the user device. In particular, the system is configured to present an integrated central user interface for communicating with the user via natural language or conversation channels, for execution of one or more user activities, and for integrating the functionality of multiple applications in a single interface, without requiring the user to access the multiple applications individually and be proficient in their operation.

As such, the multi-channel cognitive resource user application 122 is configured to perform one or more user activities in a convenient and timely manner, via a central user interface of the application 122. In this regard, in some embodiments, the central user interface is presented on one or more user devices via the multi-channel cognitive resource user application 122 or another user application 122. The central user interface or multi-channel cognitive resource interface associated with the user application 122 may be presented on the display device 112 of the user device 104 in response to receiving an indication from the user (for example, receiving a voice command from the user with an identifier associated with the multi-channel cognitive resource platform, receiving a tactile indication or a fingerprint authentication from a home button of the device 104, successful authentication of authentication credentials and the like), automatically in response to detecting an action trigger (for example, determining that the user is attempting to perform a user activity by using a particular application, determining that a user resource is associated with a predetermined threshold value, determining that the user is at a predetermined location and the like), and the like.

Typically, the central user interface is a computer human interface, and specifically a natural language/conversation user interface for receiving user input (for example, for creating, selecting and modifying data/functionality), presenting information regarding user activities, providing output to the user, and otherwise communicating with the user in a natural language of the user, via suitable communication mediums such as audio, textual, and the like. The natural language of the user comprises linguistic phenomena such as verbs, phrases and clauses that are associated with the natural language of the user. The system is configured to receive, recognize and interpret these linguistic phenomena of the user input and perform user activities accordingly. In this regard, the system is configured for natural language processing and computational linguistics. In many instances, the system is intuitive, and is configured to anticipate user requirements, data required for a particular activity and the like, and request activity data from the user accordingly.

In some instances, various features and functions of the invention are described herein with respect to a "system." In some instances, the system may refer to the authentication system 108 and/or the resource processing system 106 performing one or more steps described herein in conjunction with other devices and systems, either automatically based on executing computer readable instructions of the memory device 150, or in response to receiving control instructions from the authentication system 108 and/or the resource processing system 106. In some instances, the system refers to the authentication system 108 and/or the resource processing system 106. In some instances, the system refers to the devices and systems on the network environment 100 of FIGS. 1A-1B. In some instances, the system refers to the user mobile device 104. The features and functions of various embodiments of the invention are be described below in further detail.

Referring now to FIG. 3, illustrating a high-level process flow 300 for dynamic stepped multi-level authentication in accordance with some embodiments of the invention. The process flow involves progressively authenticating transmitted activity processing data over escalating authentication levels using electronic communications between network devices over separate communication channels. In some embodiments, some or all of the steps of the process flow 300 are performed by the authentication system 108, alone or in conjunction with the resource processing system 106, e.g., based on causing the user device 104, the first networked device 180a, and/or the second networked device 180b to perform certain functions. In some embodiments, the "system" as used with respect to the steps 302-318 herein may refer to the authentication system 108, or the authentication system 108 in combination with the resource processing system 106.

The process flow 300 begins with the system receiving information regarding at least one user activity (e.g., a transaction) associated with a user initiated at a first networked device 180a (e.g., a card reader, a point of sale terminal, an ATM, etc.). Specifically, the system may first determine operative communication between a first networked device 180a associated with first entity and a resource instrument device 110 via a first proximity communication channel 10a between the first networked device 180a and the resource instrument device 110, as indicated by block 302. Next, at block 304, the system may receive resource activity processing data from the first networked device 180a. The resource activity processing data is typically associated with a first activity initiated at the first networked device 180a. The resource activity processing data is typically comprises activity processing parameters associated with performing the first activity using the resource instrument device 110 such as transaction details such as amount, entity/merchant identifiers, product/service purchase details, user unique identifier, unique identifiers of the resource instrument device 110, and/or the like. In some embodiments the system, for example, the receives information regarding the operative communication and the information regarding the first activity in real time. In this regard the system may receive information regarding the first activity that the user initiates or seeks to initiate, the first activity that the user in in the process of executing and/or the first activity that the user has completed. For example, the system may receive an indication that the user wishes to initiate the first activity with the entity (e.g., one or more merchants).

In some embodiments the system may receive the information regarding the first activity and/or perform the one or more subsequent steps of the process flow 300 during the initiation of the first activity. In this instance, the dynamic stepped multi-level authentication is associated with authenticating the user, authorizing the user to perform the first activity, validating the first activity, approving the first activity and/or authorizing the first activity itself. In other embodiments, in addition to or separately from the previous embodiments, the system may receive the information regarding the first activity and/or perform one or more subsequent steps of the process flow 300 during the execution of the first activity, for example in the time period between the initiation and completion of the first activity by the user. Completion of the first activity, typically includes in some embodiments, completion or termination of the first activity from the user's perspective. For example, in some embodiments, the first activity is complete when at least the user is authenticated, the payment credentials are verified and the first activity is authorized and/or approved, after which the user considers the first activity complete and may leave the store, log off the merchant's website/payment portal, terminate the telephone call and the like. As another example, completion of the first activity, in some embodiments, comprises the entity/merchant submitting the relevant information associated with the first activity to a financial institution/entity for settlement, placing the first activity in a pending transaction queue for settlement and the like. In some embodiments, the first activity is temporarily authorized in the completion stage and is later routed for further processing and settlement. In some embodiments, the system may receive the information regarding the first activity and/or perform the subsequent steps of the process flow 300 after the completion of the first activity, for example, in the time period between the completion of the first activity by the user and the settlement of the first activity at a predetermined future settlement date, in combination with or distinctly from the previous embodiments. The predetermined future settlement date may comprise settlement of the first activity by the user's financial institution, by the entity/merchant or a financial institution associated with the merchant, debiting of the user account or posting payments after prior temporary authorization, transmitting funds associated with the first activity to the entity/merchant/merchant account and the like.

Next, the system may determine a user device 104 associated with a user 102 authorized for the resource instrument device 110. Here, the system may determine at least one user device associated with the activity date and the activity time of the first activity. The at least one user device may be (i) a user device that would be in the user's possession during the user activity (e.g., a mobile device, a wearable device, etc.), and/or (ii) a user device having the multi-channel cognitive resource user application 122 (also referred to as "multi-channel cognitive resource user platform application 122"). The user device may be a mobile phone, a smart phone, a wearable device, a computer, a personal digital assistant or another computing device. In some embodiments, the system may determine at least one user device based on analyzing a user information or the activity history of the user. For example, the system may determine that the user checked an account balance using a wearable device, based on analyzing the activity history of the user. In some embodiments, the system may determine the at least one user device by determining user's activities (e.g., account log-ins) at or around the date and time of the first activity and determine the at least one user device to be the device used for the activities. As another example, the user may register one or more user devices as a part of the user information. In some embodiments the user devices may have one or more applications running/installed on them. In this instance the system may determine the at least one user device based on the installation, usage or data received from the application. The one or more applications may be a financial institution application operated by/connected to the system, a merchant application, an application/widget or software inherent to the device or one or more third party applications. Typically, the one or more applications may be configured to, at least in part, aid in the authentication functions. The one or more applications may be exclusive to authentication functions or may perform these functions in addition to others. In some embodiments, the one or more applications are operatively connected to the Global Positioning Systems (GPS), other location determining systems, sensors monitoring the parameters of the user device, sensors monitoring the physical parameters of the user and the like, associated with the at least one user device.

In some embodiments the system may determine that the user is associated with a plurality of user devices, with only a portion of the user devices comprising the one or more applications configured authentication. The system may then determine one or more of the remaining portions of the user devices are capable of supporting the one or more applications and seek to install the one or more applications on the devices. While some user devices like wearable devices may not be compatible with the one or more applications, nevertheless, in some embodiments, the system may link all the user devices to each other such that user possession/authentication of one or more devices can be determined based on the linking. For example, the system may link a wearable device with a user mobile phone with the one or more applications installed, and recognize that the user authenticated himself/herself for a first time with the wearable device by providing biometric authentication, the system may then verify that the user device is in proximity of a user adorned wearable device to determine authentication of the user. As another example, the system may determine that the user has authenticated via a passcode on one device and may authenticate the user on another linked device based on the received passcode and determining that the user has been in continued possession of the devices. As another example, the user may conduct at least one transaction comprising online purchases on a computing device, without location determination capability. However, the system may determine that an auxiliary user device, for example, a wearable fitness monitoring device, linked to the user device has this capability. Then, the system may query the auxiliary device to determine user location based on determining that the auxiliary device was in the possession of the user at the transaction time and/or that the devices were paired or linked at the transaction time. Therefore, in some embodiments the at least one user device may be the device used to initiate the at least one transaction, while in other embodiments, the at least one user device may be another device linked to the device used to initiate/perform the at least one transaction or a device in the user's possession at the time of the transaction. In some embodiments, the system may determine a plurality of user devices and then choose optimal user devices based on determination of one or more factors comprising frequency of use, probability of being in the user's possession, received user preference, type of transaction and the like.

Next, at block 306, the system may authenticate the first activity for a first authentication level based on determining a spatial congruence of the user device 104 and the resource instrument device 110 associated with the first activity, via a proximity analyzer application. In some embodiments, here, the system may first determine spatial location parameters associated with the first user device 104. In some embodiments, the spatial location parameters are GPS coordinates associated with the user device. Here, the system may retrieve the GPS coordinates from the user device. Next, the system may determine activity location parameters associated with the first networked device 180a associated with the first entity. Here, the system may either retrieve the geographic parameters of the first networked device 180a from the first networked device 180a, determine the geographic parameters of the first networked device 180a based on the activity processing parameters associated with performing the first activity, and/or determine the geographic parameters of the first networked device 180a based on analyzing information associated with the first entity. The system may ascertain whether the spatial location parameters associated with the first user device 104 are within a predetermined spatial distance (e.g., 1 to 5 feet, 0 to 10 feet, and/or the like) from the activity location parameters. In response to determining that the spatial location parameters associated with the first user device 104 are within a predetermined spatial distance (e.g., 1 to 5 feet, 0 to 10 feet, and/or the like) from the activity location parameters, the system may determine the spatial congruence of the user device 104 and the resource instrument device 110.

In some embodiments, the spatial location parameters are determined based on the user device's proximity to one or more proximity marker devices 180b (e.g., beacon transmitter devices) that are associated with and/or are near (e.g., within 0 to 5 feet) of the first networked device 180a. Each of the proximity marker devices 180b may transmit proximity signals of a predetermined distance range (e.g., 1 to 5 feet, 0 to 10 feet, and/or the like) such that, the transmitted proximity signals may be received by the user device 104 only when the user device is within a predetermined spatial distance (e.g., 1 to 5 feet, 0 to 10 feet, and/or the like) from a proximity marker device. Here, the system may ascertain that the spatial location parameters associated with the first user device 104 are within a predetermined spatial distance from the activity location parameters in response to determining receipt of the transmit proximity signals transmitted by the proximity marker devices 180b at the user device 104. In response to determining that the spatial location parameters associated with the first user device 104 are within a predetermined spatial distance from the activity location parameters, the system may determine the spatial congruence of the user device 104 and the resource instrument device 110.

Next, at block 308, the system may trigger a second authentication level requirement above the first authentication level based on at least the first authentication level and the resource activity processing data, via an authentication analyzer application. To determine whether to trigger the second authentication level requirement above the first authentication level, the system may first analyze prior completed resource activity processing data associated with the user 102 (e.g., historical activity data, as described below) to determine whether the current first activity initiated at the first networked device 180a is an anomaly for the user. Here, the system may construct a security exposure value (e.g., metric, grade, score, etc.) associated with the first activity initiated at the first networked device 180a based on at least (i) the spatial congruence of the user device 104 and the resource instrument device 110 associated with the first authentication level (determined at block 306) and (ii) the prior completed resource activity processing data associated with the user 102. Here, the security exposure values may be constructed as alphanumeric codes, numerical values, color indicators, and/or the like.

In some embodiments, any security exposure value that is less than a predetermined exposure threshold indicates that the activity has a high security and that the activity is not associated with a potential security threat. Here, any security exposure value that is greater than or equal to a predetermined exposure threshold indicates that the activity may be associated with a potential security threat. In the instances where the security exposure value is below a predetermined exposure threshold such that the security exposure value is not associated with a potential security threat, the system may escalate the authentication required for processing the transaction and trigger the second authentication level requirement above the first authentication level. It is noted that this security exposure construction is non-limiting and is provided as an example. The system may employ any suitable scale, metric, or method for determining whether the security exposure value is below a predetermined exposure threshold such that the security exposure value is not associated with a potential security threat.

Alternatively, in the instances where the security exposure value is above a predetermined exposure threshold such that the security exposure value is associated with a potential security threat, the system may cease processing of the first activity and abort the first activity. Here, the system may transmit an abort notification to the first networked device 180a indicating the termination of the first activity.

Here, the prior completed resource activity processing data may comprise information associated with one or more completed activities that are in the process of being settled, one or more pending activities, one or more settled activities, one or more posted activities or a combination of the above. In this regard, the prior completed resource activity processing data may comprise one or more of: user information (financial/resource instruments/accounts used in the activity, financial resources/accounts of the user, prior activities of the user and the like), location of the activity (based on the received location of the user, location of the entity/merchant or both), activity amounts, type of activity (online, in person or by phone), entity/merchant associated with the at least one activity (entity name, entity category codes and the like), time and date of the at least one activity (time stamps associated with the initiation of the activity, completion of the activity, posting and/or settlement of the activity), status of the activity (posted, pending, completed, in the process of settlement and the like), one or more products/services associated with the activities (product name, product category code), and the like. In this regard, in some embodiments, the system may receive information associated with one or more activity and/or prior completed resource activity processing data of the user/entity from the user, a user device, financial institutions owning and/or operating one or more user accounts or payment instruments associated with one or more user accounts, merchants associated with the at least one activity and/or entities associated with merchant accounts.

Here, upon triggering the second authentication level requirement, the system may construct a validation instruction associated with the second authentication level above the first authentication level. Typically, the validation instruction is structured to cause a multi-channel cognitive resource platform user application 122 of the user device 104 to present a user authentication query (e.g., in an audio format via an audio component of the user device 104). The user authentication query may comprise a request for the user to confirm the transaction (e.g., such that the user can answer in the affirmative (yes) or negative (no)), an authentication question for the user (e.g., requesting a passcode), requesting additional authentication credentials (e.g., a device sign in, a facial recognition credential, a voice authentication credential, a fingerprint credentials, etc.), and/or the like.

In some embodiments, the system may determine an optimal the first format for presenting the validation instruction via the user device 104, to ensure security and privacy of the user data. Here the system may determine the user's proximity to other individuals (e.g., number of individuals within a predetermined distance who may be able to overhear the user's response). The system may tailor first format for presenting the validation instruction via the user device 104 based on determining the user 102's proximity to individuals during the first activity. Here, the first format may comprise at least one of an audio format (e.g., in instances where there are no individuals within a predetermined proximity to the user), and/or a visual format, a textual format, and/or a biometric format (e.g., in instances where there are greater that a predetermined number of individuals within a predetermined proximity to the user who may be able to overhear the user's response).

Next, at block 310, the system may transmit a control signal comprising a validation instruction to the user device 104. Here, the validation instruction is associated with the second authentication level above the first authentication level. Typically, control signal is structured to cause the user device 104 to present the constructed validation instruction to the user 102 in a suitable format. Moreover, in some embodiments, the validation instruction is structured to cause a multi-channel cognitive resource platform user application 122 of the user device 104 to present a user authentication query (e.g., in an audio format via an audio component of the user device 104). In some embodiments, the control signal is structured to cause the user device 104 to present the validation instruction in a first format.

In response to the validation instruction, at block 312, the system may receive from the user device 104, an authentication response provided by the user 102 at the user device 104 via a second proximity communication channel 10b. The authentication response is typically an answer to the authentication query and may be provided by the user 102 via the second proximity communication channel in a second format comprising at least one of an audio format, a visual format, a textual format, and/or a biometric format. In some embodiments, the authentication response is provided in an audio format. Here, the authentication response to the user authentication query may be provided by the user 102 via the second proximity communication channel comprising an audio communication channel.

Next, at block 314, the system may escalate the authentication of the first activity to the second authentication level based on successful validation of the authentication response provided by the user 102 at the user device 104. As discussed above, in some embodiments, the control signal is structured to cause the user device 104 to present the validation instruction in a first format. Upon receipt of the authentication response from the user, the system may determine a second format (an audio format, a visual format, a textual format, and/or a biometric format) associated with the authentication response is provided by the user 102 via the second proximity communication. Here, the system may validate the authentication response provided by the user 102 based on determining that at least (i) the second format of the authentication response, and (ii) a content of the authentication response is correct. As discussed before, the second format may comprise least one of an audio format, a visual format, a textual format, and/or a biometric format.

In some embodiments, for example, the system may determine that only audio responses are acceptable or that only biometric credentials are acceptable, or that a gesture/swipe is not acceptable. In other embodiments, the system may determine that the second format of the authentication response is correct, based on determining that the second format of the authentication response is different from the first format of the validation instruction. For example, for a validation instruction presented in an audio format, the system may require a user response in a gesture/swipe format. In other embodiments, the system may determine that the second format of the authentication response is correct, based on determining that the second format of the authentication response is different from the first format of the validation instruction. For example, for a validation instruction presented in an audio format, the system may require a user response in a gesture/swipe format.

In other embodiments, the system may determine that the second format of the authentication response is correct, based on determining that the second format of the authentication response is the same as the first format of the validation instruction. For example, for a validation instruction presented in an audio format, the system may require a user response in a the audio format. In other embodiments, the system may determine that the second format of the authentication response is correct, based on determining that the second format of the authentication response is the same as the first format of the validation instruction. For example, for a validation instruction presented in an audio format, the system may require a user response in an audio format as well.

In response to determining that the first activity is authenticated at the second authentication level, the system may process the resource activity processing data for completing the first activity at block 316. Next, at block 318, the system may transmit a notification to the first networked device 180a indicating the completion of the first activity.

As discussed previously, transmissions of activity data associated from networked devices is increasingly widespread. As detailed above, some conventional systems employ instrument devices with integrated circuit chips (e.g., credit cards with contactless payment chips) that can be read using near field communication or radio frequency communication, for the purposes of easily and quickly transmitting data for initiating activities. However, some conventional systems also allow user activities to be performed based on receiving mere unique identifiers from the user, for both in-person and online activities. These unique identifiers may be user account numbers, credit card numbers, unique username/passcode combination, and/or other user information that can uniquely identify the user. Maintaining security of activity data from such activities is even more crucial because conventional systems are unable to distinguish between an authorized user utilizing the unique identifiers and an unauthorized user utilizing the unique identifiers. Conventional systems employ mere GPS data or location data to authenticate user activities, for both activities that involve instrument devices and for those that involve unique identifiers of the users. Merely determining the geolocation may result in a false authorization of the user activity, and false failed authorizations (e.g., in the case that the authorized user is travelling) as well. Therefore, there is a need for systems, methods and computer program products for maintaining security of and authenticating activity data from networked devices for activities initiated based on unique user information, determining authorization of the users and/or the entities involved in the activities and determining validity of activities.

Embodiments of the present invention address the above needs and/or achieve other advantages by providing apparatuses (e.g., a system, computer program product and/or other devices) and methods for authentication of user activities based on establishing communication links between network devices, as will be described in detail elsewhere in the specification. The solution provided by the present system not only addresses the above concerns, but also provides a high level of authentication (i) seamlessly, (ii) without unduly interrupting the user and (iii) in the background/in parallel while other tasks are being performed as well, as described with respect to FIGS. 4A and 4B below.

FIGS. 4A and 4B illustrate high-level process flows 400A-400B for authentication of user activities based on establishing communication links between network devices. The process flow involves dynamically authenticating transmitted activity processing data based on establishing seamless electronic communication handshake between network devices and without requiring user intervention. In some embodiments, some or all of the steps of the process flows 400A-400B are performed by the authentication system 108, alone or in conjunction with the resource processing system 106, e.g., based on causing the user device 104, the first networked device 180a, and/or the second networked device 180b to perform certain functions. In some embodiments, the "system" as used with respect to the steps 402-422 herein may refer to the authentication system 108, or the authentication system 108 in combination with the resource processing system 106.

First, at block 402, the system may receive resource activity processing data associated with a first activity initiated at the first networked device 180a by a user, from a first networked device 180a associated with first entity. Typically, the resource activity processing data comprises a unique identifier associated with the user activity processing parameters associated with performing the first activity. These unique identifiers may be user account numbers, credit card numbers, unique username/passcode combination, and/or other user information that can uniquely identify the user.

Here, in some embodiments, the process flow 400A begins with the system receiving information regarding at least one user activity (e.g., a transaction) associated with a user initiated at a first networked device 180*a* (e.g., a point of sale terminal, an ATM, etc.). Moreover, the system may receive resource activity processing data from the first networked device 180*a*. The resource activity processing data is typically associated with a first activity initiated at the first networked device 180*a*. The resource activity processing data is typically comprises (i) the unique identifier associated with the user and (ii) activity processing parameters such as transaction details such as amount, entity/merchant identifiers, product/service purchase details, and/or the like. In some embodiments the system, for example, the receives information regarding the operative communication and the information regarding the first activity in real time. In this regard the system may receive information regarding the first activity that the user initiates or seeks to initiate, the first activity that the user in in the process of executing and/or the first activity that the user has completed. For example, the system may receive an indication that the user wishes to initiate the first activity with the entity (e.g., one or more merchants). In some embodiments, the resource activity processing data having the unique identifier associated with the user associated with the first activity initiated at the first networked device 180*a* is associated with a first authentication level. In other words, the unique identifier associated with the user may be adequate for establishing a first level of authentication.

In some embodiments the system may receive the information regarding the first activity and/or perform the one or more subsequent steps of the process flows 400A-400B during the initiation of the first activity. In this instance, the seamless dynamic authentication based on establishing seamless electronic communication handshake between network devices and without requiring user intervention of process flows 400A-400B, is associated with authenticating the user, authorizing the user to perform the first activity, validating the first activity, approving the first activity and/or authorizing the first activity itself. In other embodiments, in addition to or separately from the previous embodiments, the system may receive the information regarding the first activity and/or perform one or more subsequent steps of the process flows 400A-400B during the execution of the first activity, for example in the time period between the initiation and completion of the first activity by the user. Completion of the first activity, typically includes in some embodiments, completion or termination of the first activity from the user's perspective. For example, in some embodiments, the first activity is complete when at least the user is authenticated, the payment credentials are verified and the first activity is authorized and/or approved, after which the user considers the first activity complete and may leave the store, log off the merchant's website/payment portal, terminate the telephone call and the like. As another example, completion of the first activity, in some embodiments, comprises the entity/merchant submitting the relevant information associated with the first activity to a financial institution/entity for settlement, placing the first activity in a pending transaction queue for settlement and the like. In some embodiments, the first activity is temporarily authorized in the completion stage and is later routed for further processing and settlement. In some embodiments, the system may receive the information regarding the first activity and/or perform the subsequent steps of the process flows 400A-400B after the completion of the first activity, for example, in the time period between the completion of the first activity by the user and the settlement of the first activity at a predetermined future settlement date, in combination with or distinctly from the previous embodiments. The predetermined future settlement date may comprise settlement of the first activity by the user's financial institution, by the entity/merchant or a financial institution associated with the merchant, debiting of the user account or posting payments after prior temporary authorization, transmitting funds associated with the first activity to the entity/merchant/merchant account and the like.

As discussed above, in some embodiments, the resource activity processing data having the unique identifier associated with the user associated with the first activity initiated at the first networked device 180*a* is associated with a first authentication level. In other words, the unique identifier associated with the user may be adequate for establishing a first level of authentication. Here, the system may first analyze, via an authentication analyzer application, prior completed resource activity processing data associated with the user (as described previously with respect to block 308 of process flow 300 of FIG. 3). As described previously, the system may then use the authentication analyzer application to construct a security exposure value associated with the first activity initiated at the first networked device 180*a* based on at least (i) spatial congruence of the user device 104 and the second networked device associated with the first authentication level and (ii) the prior completed resource activity processing data associated with the user. As detailed with respect to FIG. 3, the system may then trigger a second authentication level requirement above the first authentication level in response to determining that the security exposure value is below a predetermined exposure threshold such that the security exposure value is not associated with a potential security threat. Upon triggering the second authentication level requirement above the first authentication level, the system may initiate the steps 404 to 422 described below.

Next, at block 404, the system may transmit a control signal to a second networked device 180*b* associated with first entity. Typically, the control signal is structured to cause the second networked device 180*b* to scan a predetermined vicinity (e.g., 1 to 5 feet, 0 to 10 feet, and/or the like) around the first networked device 180*a* to identify devices having a multi-channel cognitive resource platform user application 122. The user device 104 may be a mobile phone, a smart phone, a wearable device, a computer, a personal digital assistant or another computing device, having the multi-channel cognitive resource platform user application 122. In some embodiments, the second networked device 180*b* associated with the first entity comprises a beacon transmitter device.

In some embodiments, the second networked device 180*b* is associated with the a plurality of transmitter devices. Here, for scanning a predetermined vicinity radius around the first networked device 180*a*, the system may first activate the plurality of transmitter devices (e.g., beacon transmitters) proximate the first networked device 180*a* associated with the first entity. The system may then cause each of the plurality of transmitter devices to transmit a predetermined signal. The predetermine signal may comprise signal characteristics (e.g., frequency, modulation, encryption, content, encoding, content, etc.) such that only the multi-channel cognitive resource platform application 122 (and not other $3^{rd}$ party applications of the user device) is equipped to read, i.e., identify and process the signal and send a read receipt/confirmation. In other words, the multi-channel cognitive resource platform application 122 is structured to read the predetermined signal and transmit a response upon receiving the predetermined signal. Each of the transmitter devices may comprise a unique signal, and cause the multi-channel cognitive resource platform application 122 to transmit unique read receipt/confirmation response that can be traced back to the particular transmitter device. Upon receipt of the receipt/confirmation response, the system may identify the multi-channel cognitive resource platform application 122 as well as the user device 104 that it is resident on. Next, the system may disable the plurality of transmitter devices associated with the first entity.

In response to identifying the multi-channel cognitive resource platform user application 122 on a user device 104, the system may establish an operative communication link 10c between the second networked device 180b and the user device 104, as indicated by block 406. Here, establishing the operative communication link 10c typically comprises establishing a handshake between an entity intelligent platform application 174 associated with the second networked device 180b and the multi-channel cognitive resource platform user application 122 of the user device 104. In some embodiments, typically, establishing the handshake comprises establishing a mutual communication protocol for upcoming communications between the entity intelligent platform application 174 associated with the second networked device 180b and the multi-channel cognitive resource platform application 122 of the user device 104 via the operative communication link, at the outset before full communication can commence. Here, Handshaking can negotiate parameters that are acceptable to equipment and systems at both ends of the communication channel, including information transfer rate, coding alphabet, parity, interrupt procedure, and other protocol or hardware features. Here, via the handshake, the entity intelligent platform application 174 and the multi-channel cognitive resource platform application 122 can negotiate parameters that are acceptable to equipment and systems at the second networked device 180b of the entity system and the user device 104, respectively. These parameters can comprise information transfer rate, coding alphabet, parity, interrupt procedure, and other protocol or hardware features.

In some embodiments, for establishing the handshake between the entity intelligent platform application 174 associated with the second networked device 180b and the multi-channel cognitive resource platform application 122 of the user device 104, first the system may cause the entity intelligent platform application 174 associated with the second networked device 180b to transmit an entity synchronize message comprising an entity sequence number (e.g., "x") to the multi-channel cognitive resource platform application 122 of the user device 104. Upon receiving the entity sequence number, the multi-channel cognitive resource platform application 122 of the user device 104 may then transmit a user device synchronize acknowledgment message to the entity intelligent platform application 174. The user device synchronize acknowledgment message may comprise (i) a modified entity sequence number (f(x), i.e., a result of a function of x), and (ii) a user device sequence number (e.g., "u"). In response, the entity intelligent platform application 174 may transmit an entity synchronize acknowledgment message comprising a modified user device sequence number (g(u), i.e., a result of a function of u) to the multi-channel cognitive resource platform application 122 of the user device 104. The handshake would then be complete.

Subsequently at block 408, the system may construct a first device code associated with authenticating the first activity via the entity intelligent platform application 174 associated with the second networked device 180b and the multi-channel cognitive resource platform user application 122 of the user device 104. In some embodiments, the first device code comprises a string of characters of a predetermined length such as "b4cg7x" or "aaa555b3t". The system may then transmit the constructed first device code to the user device 104, as indicated by block 410, and to the second networked device 180b, as indicated by block 412.

Typically, the transmitted first device code is structured to cause the multi-channel cognitive resource platform user application 122 of the user device 104 to transform the first device code into a format compatible with the operative communication link with the second networked device 180b (as established during the handshake). In some embodiments, the first device code may be encrypted/encoded by the system to transform the data into a new format such that only the entity intelligent platform application 174 of the second networked device 180b may comprise the decryption key or may be able to decrypt/decode the first device code for further processing, thereby improving the security of the authentication information.

As indicated by block 414, the system may cause the multi-channel cognitive resource platform user application 122 of the user device 104 to output the transformed first device code to the entity intelligent platform application 174 of the second networked device 180b via the operative communication link 10c.

Next, as indicted by block 416, the entity intelligent platform application 174 of the second networked device 180b may identify a code match between the transformed first device code output by the user device 104 and the constructed first device code. In other words, the entity intelligent platform application 174 may determine whether the transformed first device code output by the user device 104 matches the code previously received from the system (at block 412).

The system may authenticate the first activity for based on (i) the identified code match and (ii) determining a device match between the user device 104 and the unique identifier associated with the user, as indicated by block 418. Typically, the device match may involve determining that the user device is associated with the user, and/or that the user device transmitting the code is the device that the code was sent to.

As discussed above, in some embodiments, the resource activity processing data having the unique identifier associated with the user associated with the first activity initiated at the first networked device 180a is associated with a first authentication level. In other words, the unique identifier associated with the user may be adequate for establishing a first level of authentication. The system may then trigger a second authentication level requirement above the first authentication level in response to determining that the security exposure value is below a predetermined exposure threshold such that the security exposure value is not associated with a potential security threat. Here, authenticating the first activity based on the identified code match comprises authenticating the first activity at the second authentication level.

In response to determining that the first activity is authenticated, the system may process the resource activity processing data for completing the first activity at block 420. Finally, the system may transmit a notification to the first networked device 180a indicating the completion of the first activity, as indicated by block 422.

As alluded to previously, the system determines an optimal level of authorization associated with the user activity.

In some embodiments, the system determines a desired level of authorization associated with the activity, based on at least the activity information. In this regard, the system may analyze the activity information, the user information (for example, contact information) and financial information of the user and/or the activity history of the user to determine the desired level of authorization required to permit and/or process the activity, based on one or more factors, singularly or in combination. For example, the system may determine that the activity amount is above a predetermined threshold value, and hence determine a higher level of desired authorization. As another example, the system may analyze the activity information and determine a product type/merchant category identifier (for example, groceries/retailer category A) and a activity location (for example location B of the retailer/merchant) associated with the activity. The system may further analyze the user's activity history and determine that the user frequently purchases groceries at the particular location of the merchant, and therefore assign a lower level of desired authorization. In another instance, the system may assign a higher level of desired authorization for online activities in comparison with the desired level of authorization of in-store activities for the same merchant. As another example, activities involving debit cards/savings accounts or activity credentials/financial instruments associated with debit cards/savings accounts may comprise a higher desired level of authorization in comparison with those associated with credit cards. In some embodiments, a continuum of desired levels of authorization may be used to quantify (or dictate) the number or context in which activities are permitted. For example, the continuum of desired levels of authorization may range from zero authorization required to the highest authorization required, with one or more progressive authorization levels in between. These desired authorization levels may be identified by alpha numeric identifiers, pictorial identifiers, or any other suitable way. For example, level A may be the highest desired authorization level with levels B-D progressively leading to the lowest desired authorization level E. Although illustrated as comprising five levels, the continuum may comprise more or fewer levels.

The system then determines at least one method of authentication for the second authentication level and constructs the validation instruction accordingly. In some instances, the at least one method of authentication comprises one or more authentication credentials provided by the user in response to the validation instruction. In some embodiments, the at least one method of authentication comprises the authentication method that the user utilized to authenticate himself/herself to the activity user device utilized to initiate the activity or an auxiliary device in communication with the activity user device, prior to, at the beginning of or during the activity session. In some embodiments, the validation instruction is constructed to request biometric credentials of the user, such that the user may be authenticated by receiving and analyzing authentication credentials comprising biometric credentials of the user, for example, fingerprint scans, iris recognition, retina scans, facial recognition, hand geometry, voice recognition and the like. In some embodiments the user may be authenticated based on authentication credentials comprising behavioral characteristics like device usage patterns, movement/orientation of the user device, typing rhythm, gait, gestures, cardiac and other characteristics. In some embodiments the user may be authenticated based on pre-authenticated auxiliary devices, for example a user in continued possession of a pre-authenticated auxiliary device (for example, a wearable device) in operative communication with the user device may be authenticated based on continued monitoring of the user device and the auxiliary device. In some embodiments the user may be authenticated based on received userID and passcodes with pictorial and/or alphanumeric data. Further, in some situations, challenge questions, familiar pictures and/or phrases, biometrics, key fob-based alphanumeric codes and/or collocation, authentication of another application such as a similar application or an "overarching" application, and/or the like may be used as methods of authentication. In some embodiments, the identity of the device being used by the user may be used to authenticate the identity of the user. The different types of authentication may provide differing degrees of confidence regarding the authentication using such types and thereby provide different levels of authentication. For example, if a username by itself is used for a first user authentication, and a username along with a password is used for a second authentication, then the second authentication should provide a higher level of authorization because of the additional layer of authentication required. Further, within the types of authentication, varying levels of authorization may be used. As another example, the authentication method based on biometric information of the user may be determined to comprise a higher level of user authorization, in comparison with another method comprising a passcode or a swipe pattern since biometric information cannot be reproduced as easily.

Accordingly, a continuum of authentication may be used to quantify (or dictate) the levels of authentication. Likewise, a continuum of functions permitted may be used to quantify (or dictate) the number or context in which functions (e.g., types of activities) are permitted. For example, the continuum of desired levels of may range from zero user authorization level requiring no authentication credentials to a highest user authorization level requiring one or more authentication credentials with high confidence, with one or more progressive authorization levels in between. These user authorization levels may be identified by alpha numeric identifiers, pictorial identifiers, or any other suitable way. For example, level A may be the highest user authorization level with levels B-D progressively leading to the lowest user authorization level E. Although illustrated as comprising five levels, the continuum may comprise more or fewer levels. For example, level E may be a "zero authentication" level requiring no authentication credentials, while in the other hand level A may be a "hard authentication" requiring full authentication credentials or the strictest combination of credentials. In between the two extremes, "a soft authentication" requires minimal credentials, moderate credentials or most credentials for various points along the continuum. The continuum generally represents the number of credentials required and/or the relative strength of the credentials required for that point on the continuum.

Referring to FIG. 5A, a continuum of authentication 500A is illustrated according to embodiments of the invention. On the left-hand side of the continuum, a "zero authentication"/lowest level of authentication requires no authentication credentials. On the right-hand side of the continuum, a "hard authentication"/highest level of authentication requires full authentication credentials. This means that it requires the strictest combination of credentials. In between the two extremes, "a soft authentication" requires minimal credentials, moderate credentials or most credentials for various points along the continuum. The continuum generally represents the number of credentials required and/or the relative strength of the credentials required for that point on the continuum. As discussed below with reference to FIG. 5C, the continuum of authentication 500A may be coupled with a functions permitted continuum 500B, first illustrated in FIG. 5B.

Referring to FIG. 5B, the functions permitted continuum 500B illustrates various levels of functions (e.g., electronic activities) permitted. Functions may refer to what a user is permitted to "see" and/or what the user is permitted to "do". More specifically, this may refer to whether a specific function is permitted at a certain point on the continuum and/or the context in which a certain function is permitted. The left-hand side of the continuum indicates that no functions are permitted, and the right-hand side of the continuum indicates that all functions are permitted. In between the extremes, minimal functions are permitted, moderate functions are permitted, and most functions are permitted. Thus, any given point along the continuum 500B corresponds with a certain amount and/or number of functions that are permitted and/or the context in which certain functions are permitted.

Referring now to FIG. 5C, a diagram 500C illustrates a coupling of the functions permitted continuum 500B and the levels of authentication continuum 500A. As shown, the continua 500B and 500A may be coupled with one another such that the various points along the continua intersect at specific points of the coupled continuum. For example, one continuum may be moved left or right with respect to the other continuum in order to achieve a different relationship between the functions permitted and the credentials required. Accordingly, for a given coupling, a specific point on continuum 500B provides that a particular function or functions may be permitted given that a specified level of authentication credentials are supplied, as indicated by the corresponding point on continuum 500A. For example, the system, a financial institution and/or a user may arrange the continua 500B and 500A with respect to one another and may adjust the arrangement based on changing desires or goals and situational instance with respect to exposure events.

In some embodiments, one or both the continua 500B and 500A may have weighted scales such that, as a point on the continuum is moved, the corresponding functions permitted and/or level of authentication required may change exponentially or otherwise. Furthermore, in various embodiments, other representations of the various functions permitted that correspond with the various levels of authentication may be used by the invention. As noted, the level of authentication required to complete an electronic activity may be increased or decreased based on exposure events. For example, if the user is typically required to provide a username and password to complete a type of activity, but the level of authentication required is increased in accordance with block 210, then the user may be prompted to provide additional (e.g., secondary) authentication information, such as a PIN or a zip code associated with the user.

Referring now to FIG. 5D, a diagram 500D illustrates a relationship between the functions permitted and the authentication types. As shown in FIG. 5D, the soft authentication continuum between zero authentication and hard authentication may include one or more authentication types (A, B, C in the Figure). In one aspect, the one or more authentication types corresponding to the one or more authentication credentials received from the user and one or more functions are positively correlated. In one aspect, the user may have to provide authentication credentials corresponding to authentication types A and B to perform moderate functions. In another aspect, the user may have to provide authentication credentials corresponding to authentication types A, B, and C to perform most functions. In yet another aspect, the user may have to only provide authentication credentials corresponding to authentication type A to perform minimal functions. For example, a username may enable the user to gain access to checking balance via an online banking application, a username and password may enable the user to gain access to checking balance, funds transfer between the user's first bank account and second bank account, and downloading previous statements, and a username, password and challenge question may enable the user to gain complete access to all the functions of an online banking transaction. By way of further example, the user may need to provide the zip code associated with the user's account in order for the user to complete a mobile wallet transaction that exceeds a defined threshold.

Although many embodiments of the present invention have just been described above, the present invention may be embodied in many different forms and should not be construed as limited to the embodiments set forth herein; rather, these embodiments are provided so that this disclosure will satisfy applicable legal requirements. Also, it will be understood that, where possible, any of the advantages, features, functions, devices, and/or operational aspects of any of the embodiments of the present invention described and/or contemplated herein may be included in any of the other embodiments of the present invention described and/or contemplated herein, and/or vice versa. In addition, where possible, any terms expressed in the singular form herein are meant to also include the plural form and/or vice versa, unless explicitly stated otherwise. As used herein, "at least one" shall mean "one or more" and these phrases are intended to be interchangeable. Accordingly, the terms "a" and/or "an" shall mean "at least one" or "one or more," even though the phrase "one or more" or "at least one" is also used herein. Like numbers refer to like elements throughout.

As will be appreciated by one of ordinary skill in the art in view of this disclosure, the present invention may include and/or be embodied as an apparatus (including, for example, a system, machine, device, computer program product, and/or the like), as a method (including, for example, a business method, computer-implemented process, and/or the like), or as any combination of the foregoing. Accordingly, embodiments of the present invention may take the form of an entirely business method embodiment, an entirely software embodiment (including firmware, resident software, micro-code, stored procedures in a database, etc.), an entirely hardware embodiment, or an embodiment combining business method, software, and hardware aspects that may generally be referred to herein as a "system." Furthermore, embodiments of the present invention may take the form of a computer program product that includes a computer-readable storage medium having one or more computer-executable program code portions stored therein. As used herein, a processor, which may include one or more processors, may be "configured to" perform a certain function in a variety of ways, including, for example, by having one or more general-purpose circuits perform the function by executing one or more computer-executable program code portions embodied in a computer-readable medium, and/or by having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, electromagnetic, infrared, and/or semiconductor system, device, and/or other apparatus. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as, for example, a propagation signal including computer-executable program code portions embodied therein.

One or more computer-executable program code portions for carrying out operations of the present invention may include object-oriented, scripted, and/or unscripted programming languages, such as, for example, Java, Perl, Smalltalk, C++, SAS, SQL, Python, Objective C, JavaScript, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F#.

Some embodiments of the present invention are described herein with reference to flowchart illustrations and/or block diagrams of apparatus and/or methods. It will be understood that each block included in the flowchart illustrations and/or block diagrams, and/or combinations of blocks included in the flowchart illustrations and/or block diagrams, may be implemented by one or more computer-executable program code portions. These one or more computer-executable program code portions may be provided to a processor of a general purpose computer, special purpose computer, and/or some other programmable data processing apparatus in order to produce a particular machine, such that the one or more computer-executable program code portions, which execute via the processor of the computer and/or other programmable data processing apparatus, create mechanisms for implementing the steps and/or functions represented by the flowchart(s) and/or block diagram block(s).

The one or more computer-executable program code portions may be stored in a transitory and/or non-transitory computer-readable medium (e.g., a memory, etc.) that can direct, instruct, and/or cause a computer and/or other programmable data processing apparatus to function in a particular manner, such that the computer-executable program code portions stored in the computer-readable medium produce an article of manufacture including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with, and/or replaced with, operator- and/or human-implemented steps in order to carry out an embodiment of the present invention.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations, modifications, and combinations of the just described embodiments can be configured without departing from the scope and spirit of the invention. Therefore, it is to be understood that, within the scope of the appended claims, the invention may be practiced other than as specifically described herein.

To supplement the present disclosure, this application further incorporates entirely by reference the following commonly assigned patent applications:

| U.S. patent application Ser. No. | Title | Filed On |
| --- | --- | --- |
| 16/925,279 | ELECTRONIC SYSTEM FOR DYNAMIC STEPPED MULTI-LEVEL AUTHENTICATION | Concurrently herewith |

What is claimed is:

1. A system for authentication of user activities based on establishing communication links between network devices, wherein the system is structured for dynamically authenticating transmitted activity processing data based on establishing seamless electronic communication handshake between network devices and without requiring user intervention, the system comprising:
   at least one memory device;
   at least one communication device connected to a distributed network;
   at least one processing device operatively coupled to the at least one memory device; and
   a module stored in the at least one memory device comprising executable instructions that when executed by the at least one processing device, cause the at least one processing device to:
      receive, from a first networked device associated with a first entity, resource activity processing data associated with a first activity initiated at the first networked device by a user, wherein the resource activity processing data comprises a unique identifier associated with the user;
      transmit a control signal to a second networked device associated with the first entity, wherein the control signal is structured to cause the second networked device to scan a predetermined vicinity radius around the first networked device to identify devices having a multi-channel cognitive resource platform application;
      in response to identifying the multi-channel cognitive resource platform application on a user device, establish an operative communication link between the second networked device and the user device, wherein establishing the operative communication link comprises establishing a handshake between an entity intelligent platform application associated with the second networked device and the multi-channel cognitive resource platform application of the user device;

construct a first device code associated with authenticating the first activity;

transmit the constructed first device code to the user device, wherein transmitted first device code is structured to cause the multi-channel cognitive resource platform application of the user device to:

transform the first device code into a format compatible with the operative communication link with the second networked device; and output the transformed first device code to the entity intelligent platform application of the second networked device via the operative communication link;

identify a code match, at the entity intelligent platform application of the second networked device, between the transformed first device code output by the user device and the constructed first device code;

authenticate the first activity based on the identified code match;

in response to determining that the first activity is authenticated, process the resource activity processing data for completing the first activity; and transmit a notification to the first networked device indicating the completion of the first activity.

2. The system of claim 1, wherein establishing the handshake between the entity intelligent platform application associated with the second networked device and the multi-channel cognitive resource platform application of the user device, comprises:

transmitting, from the entity intelligent platform application associated with the second networked device, an entity synchronize message comprising an entity sequence number to the multi-channel cognitive resource platform application of the user device;

receiving, at the entity intelligent platform application associated with the second networked device, a user device synchronize acknowledgment message comprising (i) a modified entity sequence number, and (ii) a user device sequence number, from the multi-channel cognitive resource platform application of the user device; and transmitting, from the entity intelligent platform application associated with the second networked device, an entity synchronize acknowledgment message comprising a modified user device sequence number to the multi-channel cognitive resource platform application of the user device.

3. The system of claim 1, wherein establishing the handshake between the entity intelligent platform application associated with the second networked device and the multi-channel cognitive resource platform application of the user device, comprises establishing a mutual communication protocol for upcoming communications between the entity intelligent platform application associated with the second networked device and the multi-channel cognitive resource platform application of the user device via the operative communication link.

4. The system of claim 1, wherein the executable instructions when executed by the at least one processing device further cause the at least one processing device to transmit the constructed first device code associated with authenticating the first activity to the entity intelligent platform application associated with the second networked device, wherein the first device code comprises a string of characters of a predetermined length.

5. The system of claim 1, wherein the second networked device associated with the first entity comprises a beacon transmitter device.

6. The system of claim 1, wherein causing the second networked device to scan a predetermined vicinity radius around the first networked device further comprises:

activating a plurality of transmitter devices proximate the first networked device associated with the first entity;

causing each of the plurality of transmitter devices to transmit a predetermined signal to scan for devices having the multi-channel cognitive resource platform application, wherein the multi-channel cognitive resource platform application is structured to read the predetermined signal and transmit a response upon receiving the predetermined signal;

identifying, via a first transmitter device of the plurality of transmitter devices, the multi-channel cognitive resource platform application on the user device; and disabling the plurality of transmitter devices associated with the first entity.

7. The system of claim 1, wherein authenticating the first activity further comprises authenticating the first activity based on (i) the identified code match and (ii) determining a device match between the user device and the unique identifier associated with the user.

8. The system of claim 1, wherein the resource activity processing data associated with the first activity initiated at the first networked device is associated with a first authentication level, wherein the executable instructions when executed by the at least one processing device further cause the at least one processing device to:

analyze, via an authentication analyzer application, prior completed resource activity processing data associated with the user;

construct, via an authentication analyzer application, a security exposure value associated with the first activity initiated at the first networked device based on at least (i) spatial congruence of the user device and the second networked device associated with the first authentication level and (ii) the prior completed resource activity processing data associated with the user; and in response to determining, via the authentication analyzer application, that the security exposure value is below a predetermined exposure threshold such that the security exposure value is not associated with a potential security threat, trigger a second authentication level requirement above the first authentication level;

wherein triggering the second authentication level requirement comprises transmitting the control signal to the second networked device associated with the first entity to cause the second networked device to scan the predetermined vicinity radius around the first networked device to identify devices having the multi-channel cognitive resource platform application.

9. The system of claim 8, wherein the executable instructions when executed by the at least one processing device further cause the at least one processing device to:

escalate the authentication of the first activity to the second authentication level in response to identifying the code match;

wherein authenticating the first activity based on the identified code match comprises authenticating the first activity at the second authentication level.

10. A method for authentication of user activities based on establishing communication links between network devices, wherein the method is structured for dynamically authenticating transmitted activity processing data based on establishing seamless electronic communication handshake between network devices and without requiring user intervention, the method comprising:
- receiving, from a first networked device associated with a first entity, resource activity processing data associated with a first activity initiated at the first networked device by a user, wherein the resource activity processing data comprises a unique identifier associated with the user;
- transmitting a control signal to a second networked device associated with the first entity, wherein the control signal is structured to cause the second networked device to scan a predetermined vicinity radius around the first networked device to identify devices having a multi-channel cognitive resource platform application;
- in response to identifying the multi-channel cognitive resource platform application on a user device, establishing an operative communication link between the second networked device and the user device, wherein establishing the operative communication link comprises establishing a handshake between an entity intelligent platform application associated with the second networked device and the multi-channel cognitive resource platform application of the user device;
- constructing a first device code associated with authenticating the first activity;
- transmitting the constructed first device code to the user device, wherein transmitted first device code is structured to cause the multi-channel cognitive resource platform application of the user device to:
  - transform the first device code into a format compatible with the operative communication link with the second networked device; and
  - output the transformed first device code to the entity intelligent platform application of the second networked device via the operative communication link;
- identifying a code match, at the entity intelligent platform application of the second networked device, between the transformed first device code output by the user device and the constructed first device code;
- authenticating the first activity based on the identified code match;
- in response to determining that the first activity is authenticated, processing the resource activity processing data for completing the first activity; and
- transmitting a notification to the first networked device indicating the completion of the first activity.

11. The method of claim 10, wherein establishing the handshake between the entity intelligent platform application associated with the second networked device and the multi-channel cognitive resource platform application of the user device, comprises:
- transmitting, from the entity intelligent platform application associated with the second networked device, an entity synchronize message comprising an entity sequence number to the multi-channel cognitive resource platform application of the user device;
- receiving, at the entity intelligent platform application associated with the second networked device, a user device synchronize acknowledgment message comprising (i) a modified entity sequence number, and (ii) a user device sequence number, from the multi-channel cognitive resource platform application of the user device; and
- transmitting, from the entity intelligent platform application associated with the second networked device, an entity synchronize acknowledgment message comprising a modified user device sequence number to the multi-channel cognitive resource platform application of the user device.

12. The method of claim 10, wherein establishing the handshake between the entity intelligent platform application associated with the second networked device and the multi-channel cognitive resource platform application of the user device, comprises establishing a mutual communication protocol for upcoming communications between the entity intelligent platform application associated with the second networked device and the multi-channel cognitive resource platform application of the user device via the operative communication link.

13. The method of claim 10, wherein the method further comprises transmitting the constructed first device code associated with authenticating the first activity to the entity intelligent platform application associated with the second networked device, wherein the first device code comprises a string of characters of a predetermined length.

14. The method of claim 10, wherein authenticating the first activity further comprises authenticating the first activity based on (i) the identified code match and (ii) determining a device match between the user device and the unique identifier associated with the user.

15. The method of claim 10, wherein the resource activity processing data associated with the first activity initiated at the first networked device is associated with a first authentication level, wherein the method further comprises:
- analyzing, via an authentication analyzer application, prior completed resource activity processing data associated with the user;
- constructing, via an authentication analyzer application, a security exposure value associated with the first activity initiated at the first networked device based on at least (i) spatial congruence of the user device and the second networked device associated with the first authentication level and (ii) the prior completed resource activity processing data associated with the user; and
- in response to determining, via the authentication analyzer application, that the security exposure value is below a predetermined exposure threshold such that the security exposure value is not associated with a potential security threat, triggering a second authentication level requirement above the first authentication level;
- wherein triggering the second authentication level requirement comprises transmitting the control signal to the second networked device associated with the first entity to cause the second networked device to scan the predetermined vicinity radius around the first networked device to identify devices having the multi-channel cognitive resource platform application.

16. The method of claim 15, wherein the method further comprises:
- escalating the authentication of the first activity to the second authentication level in response to identifying the code match;
- wherein authenticating the first activity based on the identified code match comprises authenticating the first activity at the second authentication level.

17. A computer program product for authentication of user activities based on establishing communication links between network devices, wherein the computer program product is structured for dynamically authenticating transmitted activity processing data based on establishing seamless electronic communication handshake between network devices and without requiring user intervention, wherein the computer program product comprises a non-transitory computer-readable medium comprising code that when executed causes a first apparatus to:
  receive, from a first networked device associated with a first entity, resource activity processing data associated with a first activity initiated at the first networked device by a user, wherein the resource activity processing data comprises a unique identifier associated with the user;
  transmit a control signal to a second networked device associated with the first entity, wherein the control signal is structured to cause the second networked device to scan a predetermined vicinity radius around the first networked device to identify devices having a multi-channel cognitive resource platform application;
  in response to identifying the multi-channel cognitive resource platform application on a user device, establish an operative communication link between the second networked device and the user device, wherein establishing the operative communication link comprises establishing a handshake between an entity intelligent platform application associated with the second networked device and the multi-channel cognitive resource platform application of the user device;
  construct a first device code associated with authenticating the first activity;
  transmit the constructed first device code to the user device, wherein transmitted first device code is structured to cause the multi-channel cognitive resource platform application of the user device to:
    transform the first device code into a format compatible with the operative communication link with the second networked device; and
    output the transformed first device code to the entity intelligent platform application of the second networked device via the operative communication link;
  identify a code match, at the entity intelligent platform application of the second networked device, between the transformed first device code output by the user device and the constructed first device code;
  authenticate the first activity based on the identified code match;
  in response to determining that the first activity is authenticated, process the resource activity processing data for completing the first activity; and
  transmit a notification to the first networked device indicating the completion of the first activity.

18. The computer program product of claim 17, wherein establishing the handshake between the entity intelligent platform application associated with the second networked device and the multi-channel cognitive resource platform application of the user device, comprises:
  transmitting, from the entity intelligent platform application associated with the second networked device, an entity synchronize message comprising an entity sequence number to the multi-channel cognitive resource platform application of the user device;
  receiving, at the entity intelligent platform application associated with the second networked device, a user device synchronize acknowledgment message comprising (i) a modified entity sequence number, and (ii) a user device sequence number, from the multi-channel cognitive resource platform application of the user device; and
  transmitting, from the entity intelligent platform application associated with the second networked device, an entity synchronize acknowledgment message comprising a modified user device sequence number to the multi-channel cognitive resource platform application of the user device.

19. The computer program product of claim 17, wherein establishing the handshake between the entity intelligent platform application associated with the second networked device and the multi-channel cognitive resource platform application of the user device, comprises establishing a mutual communication protocol for upcoming communications between the entity intelligent platform application associated with the second networked device and the multi-channel cognitive resource platform application of the user device via the operative communication link.

20. The computer program product of claim 17, wherein the non-transitory computer-readable medium further comprises code that when executed causes the first apparatus to transmit the constructed first device code associated with authenticating the first activity to the entity intelligent platform application associated with the second networked device, wherein the first device code comprises a string of characters of a predetermined length.

* * * * *